US012783903B2

(12) United States Patent
Letunovskiy et al.

(10) Patent No.: US 12,783,903 B2
(45) Date of Patent: Nov. 3, 2026

(54) HARDWARE-AWARE NEURAL NETWORK DESIGN

(71) Applicant: HUAWEI TECHNOLOGIES CO., LTD., Shenzhen (CN)

(72) Inventors: Alexey Aleksandrovich Letunovskiy, Moscow (RU); Vladimir Sergeevich Polovnikov, Moscow (RU); Vladimir Petrovich Korviakov, Moscow (RU); Ivan Leonidovich Mazurenko, Moscow (RU); Yepan Xiong, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 511 days.

(21) Appl. No.: 18/516,565

(22) Filed: Nov. 21, 2023

(65) Prior Publication Data

US 2024/0169213 A1 May 23, 2024

Related U.S. Application Data

(63) Continuation of application No. PCT/RU2021/000206, filed on May 21, 2021.

(51) Int. Cl.

*G06N 3/082* (2023.01)
*G06N 3/0464* (2023.01)
*G06N 3/0985* (2023.01)

(52) U.S. Cl.

CPC ......... *G06N 3/0985* (2023.01); *G06N 3/0464* (2023.01)

(58) Field of Classification Search

CPC ...................................................... G06N 3/082

See application file for complete search history.

(56) References Cited

U.S. PATENT DOCUMENTS

| | | | |
|---|---|---|---|
| 2019/0347537 | A1 | 11/2019 | Howard et al. |
| 2020/0143227 | A1 | 5/2020 | Tan et al. |
| 2020/0257961 | A1 | 8/2020 | Hua et al. |

OTHER PUBLICATIONS

"Convolutional Neural Network," Wikipedia, [online], https://en.wikipedia.org/wiki/Convolutional_neural_network, total 37 pages (Oct. 29, 2024).

Hong et al., "How to Own NAS in Your Spare Time," Published as a conference paper at ICLR 2020, arXiv:2002.06776v1 [cs.CR], XP081601116, total 16 pages (Feb. 17, 2020).

Gómez, "Understanding Categorical Cross-Entropy Loss, Binary Cross-Entropy Loss, Softmax Loss, Logistic Loss, Focal Loss and All Those Confusing Names," [online], https://gombru.github.io/2018/05/23/cross_entropy_loss/, total 12 pages (May 23, 2018).

(Continued)

*Primary Examiner* — Young Lee

(74) *Attorney, Agent, or Firm* — Leydig, Voit & Mayer, Ltd.

(57) ABSTRACT

A method for searching for one or more neural network (NN) architectures is provided. The method determines a search space comprising a plurality of architectures including one or more blocks, wherein a block of the one or more blocks is formed by one or more NN layers. The determining is based on a measure including: an amount of matrix operations, and/or one of: i) an amount of layer input data and/or layer output data, and ii) an amount of vector operations. The method searches for the one or more NN architectures in the determined search space.

13 Claims, 14 Drawing Sheets

(56) References Cited

OTHER PUBLICATIONS

Barreda et al., "Performance Modeling of the Sparse Matrix-Vector Product via Convolutional Neural Networks," The Journal of Supercomputing, Springer, US, New York, vol. 76, No. 11, XP037244474, total 18 pages (Feb. 4, 2020).
Browniee, "A Gentle Introduction to Object Recognition With Deep Learning," [online], https://machinelearningmastery.com/object-recognition-with-deep-learning/, total 21 pages (Jan. 27, 2021).
Wistuba et al., "A Survey on Neural Architecture Search," arXiv:1905.01392v1 [cs.LG], XP081370836, total 45 pages (May 4, 2019).
"CS231n Convolutional Neural Networks for Visual Recognition," Course Website, [online], https://cs231n.github.io/classification/, total 2 pages (Nov. 2024).
Tan et al., "MnasNet: Platform-Aware Neural Architecture Search for Mobile," 2019 IEEE/CVF Conference on Computer Vision and Pattern Recognition (CVPR), XP033687287, total 9 pages, Institute of Electrical and Electronics Engineers, New York, New York (Jun. 15, 2019).
Hui, "Real-time Object Detection with YOLO, YOLOv2 and now YOLOv3," [online], https://medium.com/@jonathan_hui/real-time-object-detection-with-yolo-yolov2-28b1b93e2088, total 25 pages (Mar. 18, 2018).
"ImageNet Website Update," [online], http://www.image-net.org/, total 1 page (Mar. 11, 2021).
He et al., "Deep Residual Learning for Image Recognition," Computer Vision and Pattern Recognition, arXiv:1512.03385v1 [cs.CV], total 12 pages (Dec. 10, 2015).
Tan et al., "EfficientNet: Rethinking Model Scaling for Convolutional Neural Networks," International Conference on Machine Learning, arXiv:1905.11946v5 [cs.LG], total 11 pages (Sep. 11, 2020).
Gupta et al., "Accelerator-Aware Neural Network Design Using AutoML," arXiv:2003.02838v1 [eess.SP], total 5 pages (Mar. 5, 2020).
Howard et al., "MobileNets: Efficient Convolutional Neural Networks for Mobile Vision Applications," arXiv:1704.04861v1 [cs.CV], total 9 pages (Apr. 17, 2017).
Zoph et al., "Learning Transferable Architectures for Scalable Image Recognition," arXiv:1707.07012v4 [cs.CV], total 14 pages (Apr. 11, 2018).
Garipov et al., "Ultimate Tensorization: Compressing Convolutional and FC Layers Alike," arXiv:1611.03214v1 [cs.LG], total 6 pages (Nov. 10, 2016).

HARDWARE-AWARE NEURAL NETWORK DESIGN

CROSS-REFERENCE TO RELATED APPLICATIONS

This application is a continuation of International Application No. PCT/RU2021/000206, filed on May 21, 2021, the disclosure of which is hereby incorporated by reference in its entirety.

FIELD

The present disclosure relates to methods and apparatuses for design of neural networks for efficient hardware implementation.

BACKGROUND

During recent years deep learning reached significant breakthrough in many practical problems, such as computer vision (e.g. object detection, segmentation and face identification), natural language processing and speech recognition as well as many others. For many years main goal of research was to improve quality of models, even if model size and latency was impractically high. However, for production solutions, which often require real-time operation, latency of the model plays very important role.

It is thus desirable to provide neural network architectures which may efficiently operate on hardware, in particular with regard to the latency.

SUMMARY

This application provides methods and apparatuses, to improve search for neural network architectures. In some embodiments, the search takes into account the hardware for implementing the neural network processing.

According to a first aspect, a method is provided for searching for one or more neural network, NN, architectures. The method may be performed by an apparatus or a system comprising one or more processors. The method includes: determining a search space comprising a plurality of architectures including one or more blocks, wherein a block is formed by one or more NN layers and the determining is based on a measure. The measure includes (e.g. includes a term for) an amount of matrix operations, and/or one of i) an amount of layer input data and/or layer output data and ii) an amount of vector operations; and searching for the one or more NN architectures in the determined search space.

Employing the measure enables taking into account the hardware constraints with regard to performing vector operations, data transfer, and/or matrix operations. Accordingly, a search space for architectures may be reduced while still including candidate architectures likely to provide the desired performance.

For example, the measure comprises a ratio of the amount of matrix operations and the amount of layer input data and/or layer output data.

Such measure may be particularly suitable for architectures which efficiently implement matrix operations, but not vector operations and data transfer.

For example, the measure for one or more block is or includes the term:

$$\frac{w_m * \Sigma_{i=1}^{N} m(o_i)}{\Sigma_{i=1}^{N}(w_m * m(o_i) + w_d * d(o_i))};$$

wherein $m(o_i)$ represents an amount of matrix operations for an operation $o_i$, $d(o_i)$ represents an amount of layer input data and layer output data for the operation $o_i$, $w_m$ and $w_d$ are predetermined weight factors, i is an integer index, and N is a number of operations in the one or more block.

Such exemplary measure is a detailed example of the above-mentioned ratio and may be also particularly suitable for architectures which efficiently implement matrix operations, but not vector operations and data transfer.

For example, the measure comprises a ratio of the amount of matrix operations and the amount of vector operations.

Replacing data transfer with vector operations may provide a more accurate estimation of the efficiency.

In an implementation, the determining of the search space further comprises applying one or more of the following constraints:

a) each architecture comprises a plurality of stages limited by a predefined maximum of stages, each stage comprises one or more of the blocks our of a limited set of blocks, the number of blocks in each stage being limited by a predefined maximum of blocks;

b) each block comprises one or more of convolution layers out of a predefined set of convolution layers with mutually different convolution kernel sizes, each convolution layer is followed by a normalization and/or activation;

c) the activation is a rectified linear unit, ReLU, and the normalization is a batch normalization;

d) output of the block is configurable to include or not to include a skip connection;

e) one or more blocks in each stage increases the number of channels;

f) the first block in a stage has a stride of 2 or more in its first non-identity layer and no skip connection.

This set of constraints proved to be efficient for search space determination. Constraint a) provides a scalable architecture, which may be easily extended by adding blocks. It makes easier search of architecture suitable for target computer vision task. Constraint b) provides layers which may be particularly suitable for processing of images or other data with similar features. Provide combination of layers, which allow to find optimal tradeoff between latency/complexity of architecture and its accuracy. Constraint c) increases efficiency as ReLU is more suitable for the hardware than other activation functions. From the other side batch normalization could be efficiently fused with convolution operation. Constraint d) enables provision of skip connections which may improve performance of the NN in terms of accuracy. Enables flexible tradeoff between accuracy and latency/complexity. Constraint e) is a feature advantageous especially for image processing. It enables flexible tradeoff between accuracy and latency/complexity Constraint f) provides for a faster data reduction and scalability of architecture for different computer vision tasks.

In an implementation, the determining the search space includes selecting a design of search space with one or more constraints on composition or order of blocks within a NN architecture; and the design of search space is selected out of a set of designs of search space based on a function of said measure calculated for a plurality of architectures pertaining to said design of search space.

Employing the measure for designing the search space by way of constraint sets enables to find constraint sets which may produce suitable search spaces and thus, further, efficient architectures.

In an implementation, the searching for the one or more NN architectures comprises performing K times, K being a positive integer, the following steps: pseudo-randomly selecting a first set of candidate architectures from the search space; obtaining a second set of candidate architectures by removing from the first set of candidates those candidate architectures which do not satisfy a predefined condition including latency and/or accuracy; and training each candidate architecture of the second set and determining a quality and a latency of said trained candidate architecture.

Prefiltering the architectures of a search space by the desired latency and accuracy enables to further reduce the effort in training the networks for evaluation, while still maintaining most promising architectures.

In an implementation, the searching for the one or more NN architectures includes: selecting, from the second set, a third set of candidate architectures according to the determined quality and latency of the candidate architectures in the second set; applying a scaling procedure to each of the candidate architectures in the third set resulting in a fourth set of scaled candidate architectures; training each of the scaled candidate architectures of the fourth set; evaluating quality and/or latency each of the trained scaled architectures of the fourth set; and selecting, based on the evaluation, from the trained scaled candidate architectures of the fourth set, a fifth set of architectures as a result of said searching step.

Such search further reduces and refines the architectures that should be evaluated, thereby selecting most promising architectures. Scaling may further generate architectures with higher accuracy based on the architectures evaluated as having desired performance. In this way, search space size is kept lower while still providing powerful larger architectures.

In an implementation, the scaling procedure for a candidate architecture A out of the third set comprises performing one or more times: execute the architecture A on a desired target device, to measure latencies for respective blocks of the architecture A; determine a subset of candidate scaled architectures, including the blocks of the architecture A, according to the measured latencies, wherein the subset includes those candidate scaled architectures which have latency within a predetermined range; train the candidate scaled architectures of the subset; and select among the candidate trained scaled architectures of the subset one or more best trained scaled architectures and include them into said fourth set based on an inference accuracy.

Such scaling takes directly into account the hardware performance and thus further limits the search to architectures most suitable for the trained task as well as the desired hardware.

For example, the step of the determining the subset of candidate scaled architectures comprises selecting, among possible scaled architectures, a plurality of scaled architectures which: include each block of the architecture A in at least one stage, and the sum of a block latency multiplied by the number of stages said block is in for each block is within the predetermined range.

In this way, the measurements of the latency of blocks is used to estimate the latency of the scaled architectures. Such estimation has high accuracy and low complexity, as the measurement does not need to be repeated for each evaluated scaled architecture.

For example, the predetermined range is given by a desired target latency and a latency error margin specifying by how much a latency of a scaled architecture is allowed to deviate from said desired target latency.

Scaling method provides set of architectures suitable for different latency constraints, depending of target application.

In an implementation, the entire search method is performed multiple times for different numbers of stages and/or different target devices. In an implementation, scaling may be iterative, e.g. architecture scaled in step n may be further scaled in step n+1.

Iterative scaling may test and help to find architectures with various different amounts of operations.

In an implementation, the method further comprises selecting the one or more blocks depending on a desired application, and using the one or more NN architectures resulting from the search for the desired application.

Employing the best performing architectures for the application for which the search space was designed enables improving the performance, because the architecture found within such search space will be well suited for the application.

According to a second aspect, a method is provided for scaling a neural network architecture A, the method comprising: executing the architecture A on a desired target device, to measure latencies for respective blocks of the architecture A; determining a subset of candidate scaled architectures, including the blocks of the architecture A, according to the measured latencies, wherein the subset includes those candidate scaled architectures which have latency within a predetermined range; training the candidate scaled architectures of the subset; and selecting among the candidate trained scaled architectures of the subset one or more best trained scaled architectures based on an inference accuracy.

Such scaling takes directly into account the hardware performance and thus further limits the search to architectures most suitable for the trained task as well as the desired hardware.

In an implementation, the step of the determining the subset of candidate scaled architectures comprises selecting, among possible scaled architectures, a plurality of scaled architectures which: include each block of the architecture A in at least one stage; and the sum of a block latency multiplied by the number of stages said block is in for each block is within the predetermined range.

In this way, the measurements of the latency of blocks is used to estimate the latency of the scaled architectures. Such estimation has high accuracy and low complexity, as the measurement does not need to be repeated for each evaluated scaled architecture.

For example, the predetermined range is given by a desired target latency and a latency error margin specifying by how much a latency of a scaled architecture is allowed to deviate from said desired target latency.

In an implementation, the method or only the scaling part of the method is performed iteratively multiple times for different numbers of stages and/or different target devices.

In an implementation, a method is provided, using the one or more best trained scaled architectures on said target device.

Employing the best performing architectures found on the desired device for which the search space was determined and search performed enables adaption to the device architecture and thus, improvement of the NN performance on that device.

According to a third aspect, an apparatus is provided for searching for one or more neural network, NN, architectures, the apparatus comprising a processing circuitry configured to: determine a search space comprising a plurality of architectures including one or more blocks, wherein a block is formed by one or more NN layers and the determining is based on a measure including: an amount of matrix operations, and/or one of i) an amount of layer input data and/or layer output data and ii) an amount of vector operations; and search for the one or more NN architectures in the determined search space.

According to a fourth aspect, an apparatus is provided for scaling a neural network architecture A, the apparatus comprising processing circuitry configured to: execute the architecture A on a desired target device, to measure latencies for respective blocks of the architecture A; determine a subset of candidate scaled architectures, including the blocks of the architecture A, according to the measured latencies, wherein the subset includes those candidate scaled architectures which have latency within a predetermined range; train the candidate scaled architectures of the subset; and select among the candidate trained scaled architectures of the subset one or more best trained scaled architectures based on an inference accuracy.

The third and fourth aspects share the advantages with the respective first and second aspects.

It is noted that the processing circuitry of the third aspect and the fourth aspect may be further configured to perform steps described above as examples or implementations of the first and second aspects respectively.

According to a fifth aspect, a computer-readable storage medium having stored thereon instructions that, when executed, cause one or more processors to execute any of the above mentioned methods is proposed. The instructions cause the one or more processors to perform the method according to any of the first to fourth aspect or any possible embodiment or implementation of the first or second aspect.

According to a sixth aspect, a computer program product is provided including program code for performing the method according to any of the first to fourth aspect or any possible embodiment of the first or second aspect when executed on a computer.

Details of one or more exemplary embodiments are set forth in the accompanying drawings and the description below. Other features, objects, and advantages will be apparent from the description, drawings, and claims.

BRIEF DESCRIPTION OF DRAWINGS

In the following embodiments of the present disclosure are described in more detail with reference to the attached figures and drawings, in which.

DETAILED DESCRIPTION

Figure 1:
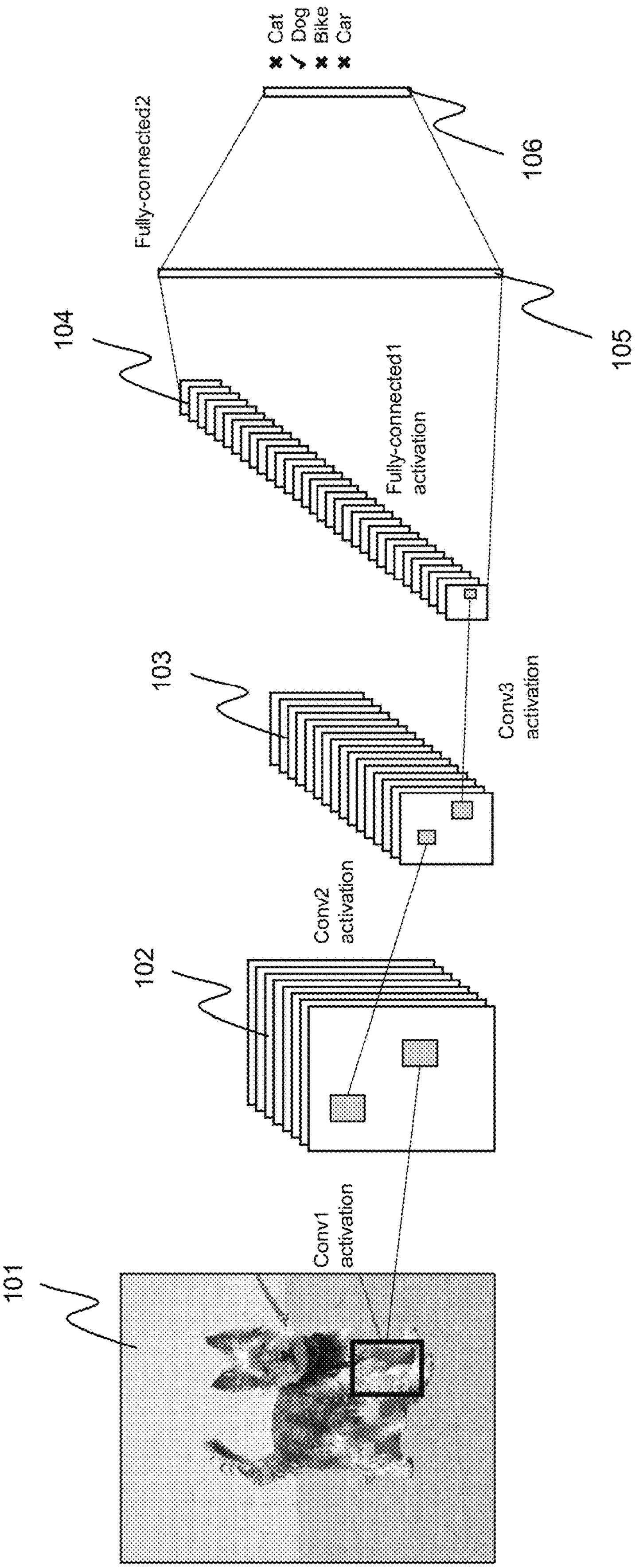
FIG. 1 is a schematic drawing illustrating processing of an image by a convolutional network for the purpose of classification.

In order to provide an efficient neural network architecture, it may be advantageous to provide a search space that includes only architectures which satisfy some suitable criteria. Such pre-selection of the architectures among which the search is to be run may speed up the search and, at the same time, provide better results—e.g. neural network architectures with lower latency and/or higher accuracy. A further or an alternative improvement of the search may be achieved by providing an efficient scaling. Especially if the desired application is known, architectures employing some repeated blocks in plural stages may be efficient.

In some embodiments, Matrix Efficiency Measure (MEM), is introduced, which is a measure of efficiency of Neural Networks for the hardware. Moreover, a carefully constructed search space comprising of hardware-friendly operations is provided alongside with a latency-aware scaling algorithm. These means are used to find a set of neural network architectures designed to be fast on specialized Neural Processing Unit (NPU) hardware and accurate at the same time.

In the following, neural network architectures and the related terminology are discussed, then the MEM is explained first, followed by the search space design and scaling algorithm. The result is the set of neural network architectures which are fast and accurate on specialized NPU hardware.

Neural Network Architectures

A neural network (NN) is a machine learning model. The deep neural network (DNN), also referred to as a multi-layer neural network, may be understood as a neural network having many hidden layers. The "many" herein does not have a special measurement standard. The DNN is divided based on locations of different layers, and a neural network in the DNN may be an input layer, a hidden layer, and an output layer. Generally, the first layer is the input layer, the last layer is the output layer, and the middle layers are the hidden layers. The output layer is not necessarily the only layer from which feature data is output. Layers may be fully connected. To be specific, any neuron at the $i^{th}$ layer in a fully-connected neural network is connected to any neuron at the $(i+1)^{th}$ layer. The DNN can be simply expressed as the following linear relationship expression: $\vec{y}=\alpha(W\vec{x}+\vec{b})$ where $\vec{x}$ is an input vector, $\vec{y}$ is an output vector, $\vec{b}$ is a bias vector. W is a weight matrix (also referred to as a coefficient), and $\alpha(\ )$ is an activation function. At each layer, the output vector $\vec{y}$ is obtained by performing such a simple operation on the input vector $\vec{x}$. Because there are many layers in the DNN, there are also many coefficients W and bias vectors $\vec{b}$, a model with a larger quantity of parameters indicates higher complexity and a larger "capacity", and indicates that the model can complete a more complex learning task. Training the deep neural network is a process of learning a weight matrix, and a final objective of the training is to obtain a weight matrix of all layers of the trained deep neural network (a weight matrix formed by vectors W at many layers).

A convolutional neural network (CNN) is a deep neural network with a convolutional structure, and is a deep learning (deep learning) architecture. As a deep learning architecture, the CNN is a feed-forward artificial neural network. The convolutional neural network includes a feature extractor constituted by a convolutional layer. The feature extractor may be considered as a filter. A convolution process may be considered as using a trainable filter to perform convolution on an input image or a convolutional feature plane (feature map). The convolutional layer may include a plurality of convolution operators. The convolution operator is also referred to be defined by a kernel. In image processing, the convolution operator functions as a filter that extracts specific information from an input image matrix. The convolution operator may be defined by a weight matrix, and the weight matrix is usually predefined (or pre-trained) in the inference stage. On the other hand, in the training stage, the weight matrix may be initialized (e.g. by random numbers) and then trained by an optimization algorithm (based on a cost function).

In a process of performing a convolution operation on an image, the weight matrix usually processes pixels at a granularity level of one pixel in a horizontal and/or vertical directions on the input image, to extract a specific feature from the image. A size of the weight matrix is typically related to a size of the on the number of channels in input data, number of convolutional filters (i.e. number of output data channels) and horizontal and vertical size of convolutional kernel kx and kh (e.g. 3×3). It should be noted that a depth dimension (depth dimension) of the weight matrix is the same as a depth dimension of the input (e.g. input picture). During a convolution operation, the weight matrix extends to an entire depth of the input picture. Therefore, a convolutional output of a single depth dimension is generated through convolution with a single weight matrix. However, in most cases a single weight matrix is not used, but a plurality of weight matrices with a same size (rows×columns), namely, a plurality of same-type matrices, are applied. Outputs of the weight matrices are stacked to form a depth dimension of a convolutional picture. Different weight matrices may be used to extract different features from the picture. For example, one weight matrix is used to extract edge information of the picture, another weight matrix is used to extract a specific color of the picture, and a further weight matrix is used to blur unneeded noise in the picture. Sizes of the plurality of weight matrices (rows× columns) are the same. Sizes of feature maps extracted from the plurality of weight matrices with the same size are also the same, and then the plurality of extracted feature maps with the same size are combined to form an output of the convolution operation. Weight values in these weight matrices need to be obtained through massive training in actual application. Each weight matrix formed by using the weight values obtained through training may be used to extract information from the input image, to enable the convolutional neural network to perform correct prediction. When the convolutional neural network has a plurality of convolutional layers, a relatively large quantity of general features are usually extracted at an initial convolutional layer. The general feature may also be referred to as a low-level feature. As a depth of the convolutional neural network increases, a feature extracted at a subsequent convolutional layer is more complex, for example, a high-level semantic feature.

A quantity of training parameters often needs to be reduced. Therefore, a pooling layer is often periodically introduced after a convolutional layer and/or a convolution with stride larger than 1 is employed. One convolutional layer may be followed by one pooling layer, or a plurality of convolutional layers may be followed by one or more pooling layers. For example, during picture processing, the pooling layer is used to reduce a space size of the picture. The pooling layer may include an average pooling operator and/or a maximum pooling operator, to perform sampling on the input picture to obtain a picture with a relatively small size. The average pooling operator may be used to calculate pixel values in the picture in a specific range, to generate an average value. The average value is used as an average pooling result. The maximum pooling operator may be used to select a pixel with a maximum value in a specific range as a maximum pooling result. In addition, similar to that the size of the weight matrix at the convolutional layer needs to be related to the size of the picture, an operator at the pooling layer also needs to be related to the size of the picture. A size of a processed picture output from the pooling layer may be less than a size of a picture input to the pooling layer. Each pixel in the picture output from the pooling layer represents an average value or a maximum value of a corresponding sub-region of the picture input to the pooling layer.

After processing performed at the convolutional layer/pooling layer, the convolutional neural network is not ready to output required output information, because as described above, at the convolutional layer/pooling layer, only a feature is extracted, and parameters resulting from the input image are reduced. However, to generate final output information (required class information or other related information) the convolutional neural network needs to use the neural network layer to generate an output of one required class or a group of required classes. Therefore, the convolutional neural network layer may include a plurality of hidden layers. Parameters included in the plurality of hidden layers may be obtained through pre-training based on related training data of a specific task type. For example, the task type may include image recognition, image classification, and super-resolution image reconstruction.

Optionally, at the neural network layer, the plurality of hidden layers are followed by the output layer of the entire convolutional neural network. The output layer has a loss function similar to a categorical cross entropy, and the loss function is specifically used to calculate a prediction error. Once forward propagation of the entire convolutional neural network is completed, backward propagation is started to update a weight value and a deviation of each layer mentioned above, to reduce a loss of the convolutional neural network and an error between a result output by the convolutional neural network by using the output layer and an ideal result.

In a process of training a deep neural network, because it is expected that an output of the deep neural network is as much as possible close to a predicted value that is actually expected, a predicted value of a current network and a target value that is actually expected may be compared, and then a weight vector of each layer of the neural network is updated based on a difference between the predicted value and the target value (certainly, there is usually an initialization process before the first update, to be specific, parameters are preconfigured for all layers of the deep neural network). For example, if the predicted value of the network is large, the weight vector is adjusted to decrease the predicted value, and adjustment is continuously performed, until the deep neural network can predict the target value that is actually expected or a value that is very close to the target value that is actually expected. Therefore, "how to obtain, through comparison, a difference between a predicted value and a target value" is predefined. Training of the deep neural network is a process of minimizing the loss as much as possible.

As mentioned above, a convolutional neural network is a subclass of DNN. The layers of a CNN are not limited to convolution layers and activation functions discussed above. The following operations and further operations may be used:

- Convolution,
- Batch normalization,
- Non-linear activation (sigmoid, Rectifier Linear Unit (ReLU), etc.),
- Fully-connected layers,
- Element-wise operations (addition, multiplication), and/or
- Downsampling (max pooling, average pooling).

Nowadays CNNs are the most used approaches at least for computer vision tasks like classification, FaceID, person re-identification, car brand recognition, object detection, semantic and instance segmentation and many others. For production applications, it is desirable for the CNNs employed to be precise (to have high inference accuracy) and fast (to have a low latency) at the same time.

As mentioned above, convolution is a widely-used operation in modern neural networks. FIG. 1 shows schematically an input image 101 a portion of which is processed by a convolutional (conv1) and activation. The convolution typically convolves the input data (input tensor) 101 of shape $N \times C_{in} \times H_{in} \times W_{in}$ (or $N \times H_{in} \times W_{in} \times C_{in}$ in some implementations) with convolutional kernel of size $K \times K \times C_{in} \times C_{out}$ and produces output data of shape $N \times C_{out} \times H_{out} \times W_{out}$. Herein, N is the size of a batch (e.g. corresponding to number of images or cropped image portions to be processed), $H_{in}$ and $H_{out}$ are heights of input and output data, $W_{in}$ and $W_{out}$ are widths of input and output data, $C_{in}$ is a number of input channels, $C_{out}$ is a number of output channels. Here input data, output data and kernel are tensors, in this example they are 4-dimensional arrays of some size along each of the four dimensions.

In FIG. 1, the input data have the batch size of 1 (one image processed) and number of channels also 1 (gray-scale image only), and a width and height larger than 1 and corresponding to the size of the input image in the respective horizontal and vertical direction (dimension). After the processing with the first convolution (conv1) and activation, a second tensor 102 is obtained, having a smaller width and height than the input tensor, but a larger amount (number) or channels. Similarly, the second tensor 102 is processed by a second convolution conv2 and an activation to obtain a third tensor 103 with an even smaller width and height and a larger amount of channels. Similarly, the third tensor 103 is processed by a third convolution conv3 and an activation to obtain a fourth tensor 104 with an even smaller width and height and a larger amount of channels. The fourth tensor 104 is then processed by a first fully connected layer and activation to obtain a fifth tensor 105. Similarly, the fifth tensor 105 is then processed by a second fully connected layer and activation to obtain a sixth tensor 106, which is also the output tensor. The output tensor here is a vector which indicates classification result, in this example, the input image is classified as showing a dog, but not a cat, a car or a bike.

Figure 2:
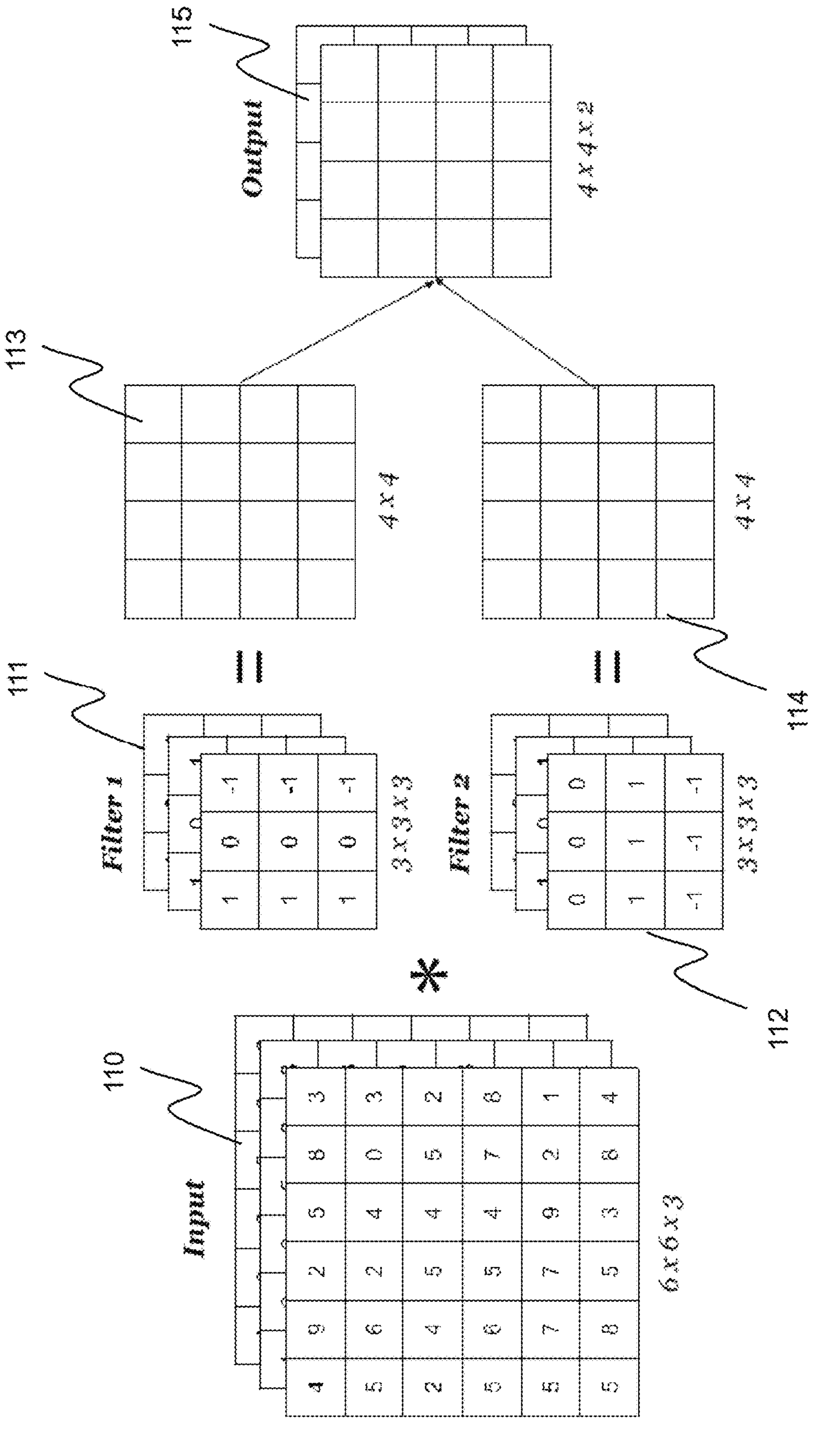
FIG. 2 is a schematic drawing of convolution operations.

FIG. 2 shows an exemplary operation of a convolutional kernel. Input data 110 is a 3D tensor of the size 6×6×3, i.e. three channels with width 6 and height 6 image samples. The input tensor 110 is convolved with two kernels 111 and 112 of a size 3×3×3. The output of each the convolution is one channel of size 4×4 (cf. tensors which are here matrixes 113 and 114). In this example, the convolution was followed by elementwise adding of the three channels. Finally, the two outputs 113 and 114 are concatenated into an output tensor 115 of the size 4×4×2.

It is noted that CNNs are not the only possible neural network architectures. The present disclosure is not limited to CNNs or DNNs either. For example, a recurrent neural network (RNN) has been widely used to process sequence data such as audio, speech or text data or the like. Further examples include recursive residual convolutional neural network (RR-CNN) or transformer architectures or the like.

In recent years there appeared a lot of specialized artificial intelligence (AI) hardware such as the Neural Processing Units (NPUs) and these devices set special limitations for the models to be deployed. These devices are typically efficient at parallelizable tasks of tensor and matrix multiplications and additions. In order to provide an efficient neural network for a certain task and device, it may be desirable to search for and find some advantageous neural network architectures. An exhaustive search is not practicable, as there is a huge amount of possible neural network architectures and in order to evaluate their performance, they would need to be trained and their performance assessed.

There have been several approaches applied so far to obtain suitable neural network architectures. For instance, a manual design has been employed. One of architecture classes is referred to is Resnet (K. He et al., Deep Residual Learning for Image Recognition, available at https://arxiv.org/abs/1512.03385). Resnet class of architectures presents residual learning framework to ease the training of networks that are substantially deeper than those used before. Layers are represented as learning residual functions with reference to the layer inputs. These residual networks are easier to optimize, while they can gain accuracy from considerably increased depth. A disadvantage of Resnets is manual design, which does not allow to obtain a good tradeoff between latency and accuracy.

In some design approaches, scaling has been applied. For example, a compound scaling is a method which uses a compound coefficient $\varphi$ to uniformly scale network width, depth, and resolution in the following way: depth: $d=\alpha^{\varphi}$, width: $w=\beta^{\varphi}$, and resolution: $r=\gamma^{\varphi}$, s.t. $\alpha \cdot \beta^2 \cdot \gamma^2 \approx 2$, with $\beta \geq 1$, $\beta \geq 1$, $\gamma \geq 1$. Herein, $\alpha$, $\beta$, $\gamma$ can be found by a more efficient search. However, this approach is based on number of floating point operations (FLOPS). For NPU devices FLOPS do not reflect latency properly. In particular, FLOPS does not take into account whether the operations are based on vector operations, matrix operations, scalar operations or the like, and does not take into account the amount of data transfer between the layers. Moreover, a uniform scaling is not optimal for low-latency architectures.

Matrix Efficiency Measure (MEM)

Figure 3:
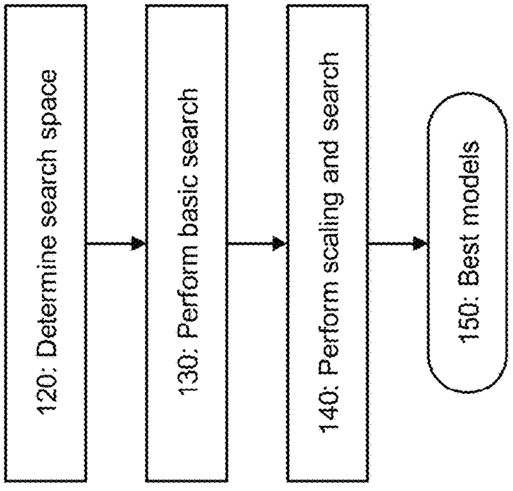
FIG. 3 is a flow diagram illustrating flow chart of a method for determining a search space and performing a search in the search space.

According to an embodiment, a method for searching for one or more neural network, NN, architectures, is provided. The method is shown in FIG. 3.

The term "architecture" herein refers to the function and order of layers in the neural network, as well as to the interconnections between the layers. The method comprises determining 120 a search space including a plurality of architectures and searching (130 and, possibly, 140) for the one or more NN architectures 150 in the determined search space. In other words, the result of the search and the output of said method is/are the one or more NN architectures found. The number of architectures to be found and output may predefined or determined based on a condition. For example, the method may be configured to output only one single architecture determined as best. In another example, the method may be configured to output exactly a certain number of architectures (e.g. three best). In another example, the method may be configured to output all those architectures, which fulfill a certain condition. For instance, all architectures that achieve certain latency and/or accuracy and/or other criteria may be output.

In general, a NN architecture (also referred herein to simply as architecture) includes one or more blocks. Each block is formed by one or more NN layers. Thus, it is possible to design a network layer by layer (if block includes only one layer). However, for some applications, it may be more efficient to design a network on a block basis. For example, in image processing it is usual to employ blocks of layers including one or more convolutions and/or other operations.

In the present embodiment, the determining of the search space is based on a measure including:

an amount of matrix operations, and/or one of i) an amount of layer input data and/or layer output data and ii) an amount of vector operations.

The amount (number) of matrix operations (not vectors, not scalars) may be given as the number of element-wise multiplications involved in the matrix multiplications. The amount of data transfers may include the amount of input data (e.g. size of the input tensor), the amount of output data (size of the output tensor) and, possibly, amount of weight data (size of the weight tensor). The amount of vector operations may be given by the number of element-wise multiplications.

In an exemplary implementation, the measure includes both, the amount of matrix operations and either one of the amount of layer input data or the amount of vector operations.

Figure 4:
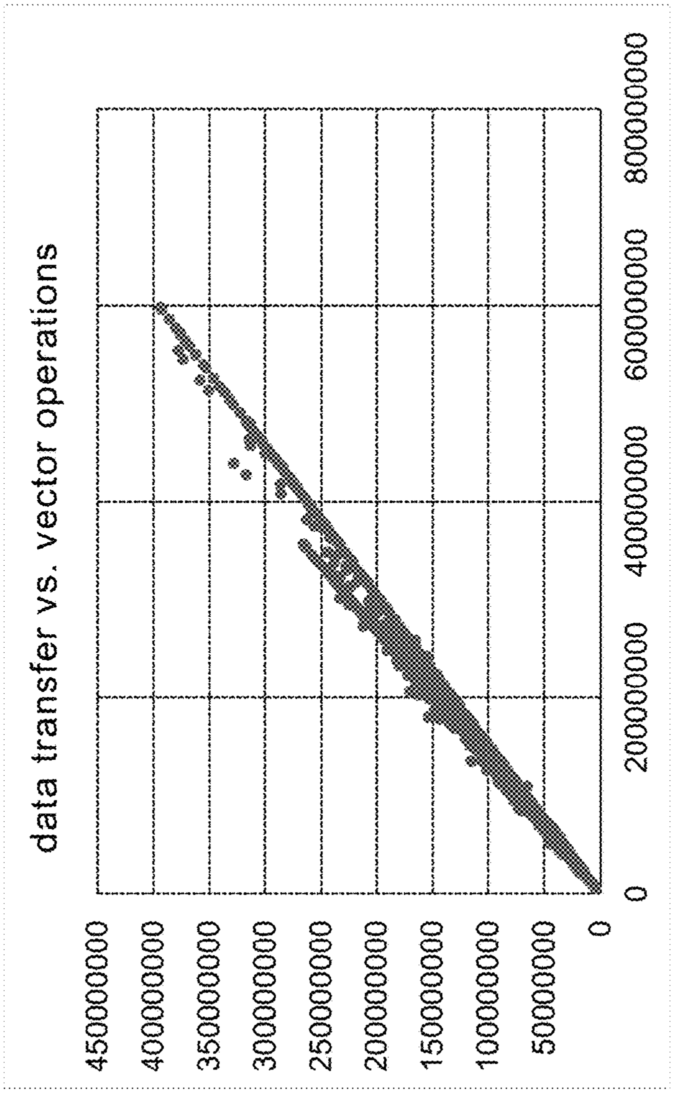
FIG. 4 is a graph illustrating the correlation between the amount of data transfer and amount of vector operations.

It is noted that the amount of layer input data and the amount of vector operations are typically highly correlated, as is shown in FIG. 4. FIG. 4 is a graph, the horizontal axis x corresponds to the amount of vector operations, whereas the vertical axis y corresponds to the amount of data transfer. Thus, the measure MEM may include either the number of vector operations or the number of data transfers and does not need to include both. FIG. 4 shows an almost linear dependency between the vector operations and the data transfer operations. This figure has been obtained experimentally for an amount of different architectures.

Any neural network (and NN architecture) can be formalized and fully defined as a directed acyclic graph with set of nodes Z. Each node $z^{(k)}$ represents a tensor and is associated with an operation $o^{(k)} \in O$ on set of its parent nodes $I^{(k)}$. An exception is the input node x which does not have input (preceding) nodes and associated operations. Computations at node k may be represented:

$$z^{(k)}=o^{(k)}(I^{(k)})$$

Set of operations O includes for instance unary operations (convolutions, pooling, activations, batchnorms, etc.) and multivariate operations (concatenation, addition, etc.). Any representation that specifies set of parents and operation of each node completely defines network architecture $\alpha$.

For example, the measure comprises a ratio of the amount of matrix operations and the amount of layer input data and/or layer output data. In particular, it may be a ratio of the amount of matrix operations on one side and the sum of amount of layer input data and layer output data and amount of matrix operations on the other side. This may reflect proportion of matrix operations among matrix and vector operations. Alternatively, proportion of the vector operations among the matrix and vector operations may be used. As mentioned above with reference to FIG. 4, the vector operations may be represented by the amount of data transfer which may be represented as a sum of number of input and output data and the weight data (optionally, if applied, also bias data). This, in an exemplary implementation, the measure comprises a ratio of the amount of matrix operations and the amount of vector operations.

The above mentioned amounts may be further weighted with some coefficients. For example the measure for one or more block is or includes the term:

$$\frac{w_m * \sum_{i=1}^{N} m(o_i)}{\sum_{i=1}^{N} (w_m * m(o_i) + w_d * d(o_i))};$$

wherein $m(o_i)$ represents an amount of matrix operations for an operation $o_i$, $d(o_i)$ represents an amount of layer input data and layer output data for the operation $o_i$, $w_m$ and $w_d$ are predetermined weight factors, i is an integer index, and N is a number of operations in the one or more block. As explained above, the term "operation" $o_i$ refers to operation associated with node i. Such operation still typically includes a plurality of elementary operations such as matrix or vector or scalar multiplications or the like.

The measure may be used to determine the efficiency of one or more blocks and each block may include one or more operations $o_i$. In general, the measure may be applied to select blocks as parts of the architectures of the search space, while the architectures may then selected in a different manner. Alternatively, the measure may be applied to select stages and/or architectures or parts of architectures to form a search space.

The MEM measure reflects efficiency of the network for a particular hardware such as NPU for the following reasons. There are two main sources of latency during neural network computations: matrix operations and data transfer (mostly including input, output and weights). Scalar operations may be considered as negligible and not counted for simplicity reasons. However, the present disclosure is not limited to cases in which the scalar operations are not counted. In some implementations, the scalar operations may be also part of the measure. NPU devices (like Ascend 310, but not limited to this device) are especially suitable for matrix computations. Other types of operations, especially data transfer, should be avoided, minimized, or at least reduced to match such devices.

As mentioned above, for each operation of in a neural network the following measures can be defined $m(o_i)$ being a number of matrix operations and $d(o_i)$ being a number of input and output data of the operation. The matrix efficiency measure (MEM) for architecture $A=\{o_1, o_2, \ldots, o_N\}$ with N operations can be estimated as follows:

$$MEM(A) = \frac{w_m * \Sigma_{i=1}^{N} m(o_i)}{\Sigma_{i=1}^{N} (w_m * m(o_i) + w_d * d(o_i))} \forall A: MEM(A) \in [0; 1);$$

The closer MEM (A) is to 1 the more friendly is A for the NPU design. However, this is only one possible measure form. As mentioned above, variations are possible. This measure provides an advantage that it is normalized to the range between 0 and 1 and reflects the main latency sources and their proportion. However, in general, the measure may include further constant or variable sources of latency and it does not have to be normalized.

The data transfer $d(o_i)$ is defined above as the number of input and output data of the operation. However, in some implementations, the data transfer may also include other data that are transferred, such as weights and/or biases or other data. It is also possible to represent data transfer only by input data or only by output data—these may be correlated in some architectures as in a large part of the network, output data of one layer or block corresponds to input data of the following layer or block. The weighting parameter(s) (such as $w_d$) may help properly reflecting the contribution of the data transfer (irrespectively of how it is defined) to the measure. It is noted that the calculation of the data transfer may depend on the hardware and software configuration. For example, in some cases, input data and output data buffers may be separated, so that transfer data may be necessary from output to input. There may be a separate weights buffer. In such configurations, data transfer in and from all there buffers may be considered to obtain the data transfer $d(o_i)$. Other hardware and software configurations are possible, so that in general, data transfer may be calculated or estimated in various ways.

For a specific search space $D=\{A_1, A_2, \ldots, A_K\}$ with K different architectures, a mean matrix efficiency measure (mMEM) can be estimated as following:

$$mMEM(D) = \frac{1}{K} \sum_{j=1}^{K} MEM(A_j)$$

As mMEM is normalized, it will take values from the interval 0 to 1. The closer is mMEM(D) to 1, the more friendly is the search space D to NPU design. Search space is a set of architectures which are evaluated to find the best appropriate one or more architectures. A search space may be seen as a subset of a set (space) of all architectures, limited by some predefined design rules (criteria) as will be discussed later by way of examples. Selection of these criteria may be referred to as design of search space.

It is noted that mMEM is only an example of a measure evaluating designs of a search space by comparing the search spaces resulting from the designs. The mMEM is based on average of the MEMs corresponding to respective architectures. However, for some applications, it may be desirable to measure the efficiency of a search space by way of other norm such as maximum, which returns as an efficiency measure of a search space the MEM of the architecture from the search space which has the highest MEM. For other applications, it may be more suitable to evaluate the lowest MEM architecture. In general, efficiency of a search space may be measured as a function of the MEMs of the architectures included in the search space.

Herein, we refer to MEM or mMEM generally as to "measure". However, this measure may be also referred to as "metric". The actual MEM (or mMEM) measure may, but does not need to fulfill the mathematic definition of the metric.

In the MEM (and correspondingly mMEM), the weights may be obtained empirically. One possible determination of weights (but not limiting), is shown below for an exemplary purpose. As is clear to those skilled in the art, other kinds of determination may be applied.

To find values of $w_m$ and $w_d$ the following linear regression model is trained, which approximates latency of an architecture A with N operations:

$$\text{latency}(A) = w_0 + w_m * \sum_{i}^{N} m(o_i) + w_d * \sum_{i}^{N} d(o_i)$$

For example, it was experimentally found that: $w_0=0.55$; $w_m=7.72e-11$; $w_d=2.69e-8$. This model has a mean absolute percentage error:

$$MAPE = \frac{1}{K} \sum_{j=1}^{K} \left| \frac{y_j^{true} - y_j}{y_j^{true}} \right| = 15.99\%$$

and coefficient of determination:

$$R^2 = 1 - \frac{\Sigma_{j=1}^{K} (y_j^{true} - y_j)^2}{\Sigma_{j=1}^{K} (y_j^{true} - y_{mean}^{true})^2} = 0.93$$

Thus, the linearly determined weights have a reasonable performance at approximating latency while still being simple to calculate. Generally, more complex approximation models may be used (e.g. non-linear regressions). In the above example, the linear regression model has been used because of simplicity and interpretability: it can be easily adapted to any other NPU and non NPU devices and coefficients ($w_m$ and $w_d$) can be interpreted as impact factors for the corresponding input parameters.

The following Table 1 shows hardware efficiency of operations according to the MEM.

TABLE 1 efficiency calculated for selected exemplary operations using MEM

| Operation | Matrix computations | Vector computations | Data | MEM(Operation) |
|---|---|---|---|---|
| conv7 × 7 | 2.94014E+11 | 0 | 29455507.79 | 9.66E−01 |
| conv5 × 5 | 1.50006E+11 | 0 | 19980582.08 | 9.56E−01 |
| conv3 × 3 | 53999861048 | 0 | 13663964.94 | 9.19E−01 |
| conv7 × 1 | 41999149833 | 0 | 12874387.79 | 9.03E−01 |

TABLE 1-continued

| efficiency calculated for selected exemplary operations using MEM | | | | |
|---|---|---|---|---|
| Operation | Matrix computations | Vector computations | Data | MEM(Operation) |
| conv5 × 1 | 29998438619 | 0 | 12084810.65 | 8.77E−01 |
| conv3 × 1 | 17997727404 | 0 | 11295233.51 | 8.21E−01 |
| conv1 × 1 | 5997016190 | 0 | 10505656.36 | 6.21E−01 |
| depthwiseconv5 × 5 | 330602328 | 0 | 10132839.22 | 8.56E−02 |
| depthwiseconv3 × 3 | 116879610.9 | 0 | 10118777.51 | 3.21E−02 |
| pool3 × 3 | 0 | 22060130.91 | 11469716.36 | 0.00E+00 |
| relu | 0 | 6471920 | 12943840 | 0.00E+00 |
| batchnorm | 0 | 51775360 | 12945001.14 | 0.00E+00 |
| elwiseadd | 0 | 6471920 | 19415760 | 0.00E+00 |
| concat | 0 | 0 | 25887680 | 0.00E+00 |

In particular, the following operations have been evaluated:

- convolutions with a kernel of size n×m (denoted as convn×m), in particular conv7×7, conv5×5, conv3×3, conv1×1, conv7×1, conv5×1, and conv3×1;
- depth-wise convolutions with kernel of sizes 3×3 and 5×5 (denoted as depthwiseconv3×3 and depthwiseconv5×5);
- batch normalization (denoted batchnorm);
- element-wise addition (denoted elwiseadd);
- concatenation (denoted concat);
- rectifier linear unit (denoted relu);
- pooling with 3×3 size (denoted pool3×3).

As can be seen from the table, squared convolutions conv7×7, conv5×5, conv3×3, conv1×1 and convolutions with non-squared kernel (7×1, 5×1, 3×1) show similar efficiency. Depthwise convolution efficiency is smaller by one order. Operations which do not have matrix operations (pooling, activation, batchnorm, addition and concatenation) are considered as non-efficient for NPU. However, for instance, a batchnorm and an activation placed after convolution operation can be efficiently fused into one operator and does not result in significant slowdown at the inference stage. Accordingly, the efficiency measure may be also used to design operation blocks which include more than one operations merged in one operation that may be executed more efficiently for a given hardware. Column "Data" specifies average amount of input and output data for each operation. The amount may be provided, e.g. in terms of a number (amount) of data elements, such as floating point numbers or the like.

Elementwise addition and concatenation operations are widely used in residual blocks (cf. e.g. the above mentioned Resnet architecture design), which may be essential for convergence of the model training. Residual blocks do not have to be avoided completely, but can be used more flexibly—depending on their real impact to model properties in order to increase efficiency.

Summarizing, the currently widely used measure based on FLOPS does not enable to distinguish between the types of operations. However, various operations may be implemented with different latency at different hardware. For example, NPUs provide for particularly efficient matrix operations involving also larger matrices. The above described measure which includes terms related to number of matrix operations and number of vector operations (or data transfer operations) provides a more suitable efficiency estimate which reflects better the latency.

The measure may be used to determine a search space (or a design of the search space) for architecture search. The search space determination may include selection of suitable operations (e.g. based on Table I or a similar table for further operations) which should be frequently present or should not be frequently present in the search space architectures or suitable blocks or stages or entire architectures. The search space determination may include determination of the design of search space—e.g. determination of constraints on selection of operations or blocks or on order of operations or blocks in architectures of the search space.

Hardware-Friendly Search Space Design and Exemplary Search

According to some exemplary implementations, neural architecture search space is selected to be a subspace of a general search space including all possible architectures. The search space limited by certain constraints is adopted in order to limit the complexity of the search. An appropriate selection (determination) of the search space may greatly reduce the search effort and, at the same time, lead faster to more suitable results.

Usually one of two search space categories is used:

- Global search space—defined for a graph that represents entire architecture (e.g. chain-structured search space).
- Cell-based search space—defines architecture as combination of cells (subgraphs) having a fixed template.

The present disclosure is applicable for both approaches. Moreover, in order to simplify the search algorithm, a scaling may be applied. For example, convolutional neural networks (also referred to as ConvNets or CNNs) are commonly developed at a fixed resource budget, and then scaled up for a better accuracy, if more resources are available. A resource budget may be given as a set of constraints such as constraints of the desired hardware, such as a device to employ the CNN. For example, the device may be a wearable, a mobile phone, a multi-core processor, a cloud, or the like. Scaling up ConvNets may be used to achieve a better accuracy. For example, the ResNet architecture mentioned above can be scaled up from ResNet-18 to ResNet-200 by using more layers. Scaling may be performed in one or more dimensions which are—depth, width, and image (tensor) size. In this particular ResNet design, −18 and −200 refer to a number of blocks of the ResNet architecture. Scaling of a ResNet is increasing number of blocks e.g. from 18 to 34, 50, 101 and finally 200.

Based on the efficiency considerations, some of which are compliant with the MEM results shown above, in some exemplary implementations, the determining of the search space further comprises applying one or more of the following constraints:

g) each architecture comprises a plurality of stages limited by a predefined maximum of stages, each stage comprises one or more of the blocks our of a limited set of blocks, the number of blocks in each stage being limited by a predefined maximum of blocks;

h) each block comprises one or more of convolution layers out of a predefined set of convolution layers with mutually different convolution kernel sizes and/or strides, each convolution layer is followed by a normalization and/or activation;

i) the activation is a rectified linear unit, ReLU, and the normalization is a batch normalization;

j) output of the block is configurable to include or not to include a skip connection;

k) one or more blocks in each stage increases the number of channels;

l) the first block in a stage has a stride of 2 or more (a positive integer of) in its first non-identity layer and no skip connection.

It is noted that the above mentioned constraints a) to f) are exemplary: one of them or a combination of two or more of them, or all, may limit the search space size while still maintaining, in the search space, architectures which are more likely to perform efficiently on the NPU.

Below, a particular example of constraints employed in a particular detailed embodiment (ISyNet-N) is provided. Based on analysis of operators NPU efficiency and in compliance with the above conditions a) to f), the search space obeys the following rules:

The architecture is divided into stages and the number of stages is not fixed, but limited.

Every stage is divided to one or more blocks ($B_s$) of identical structure. For example, all blocks $B_m$ are the same, but different from blocks $B_n$ (m, n being any two instances of integer block index s, m being different from n). Number of blocks per stage is not fixed, but limited. Number of blocks differing from each other is limited, too.

Every block is divided into edges ($E_{s,i}$). Edges correspond to neural network layers. Each edge $E_{s,i}$ is one from the list: conv_1×1, conv_3×3, conv_5×5, conv_7×7, conv_1×3_3×1, conv_1×5_5×1, conv_1×7_7×1, or identity.

Output of the block is a skip type from the list i) noSkip or ii) addSkip. noSkip means no skip connection. addSkip means add a skip connection.

Each convolution has a follow-up normalization operation (e.g. BatchNorm, etc.) and an activation (e.g., ReLU, etc), except for the last convolution in a block.

The activation from the last not identity edge of each block is from the list i) ReLU, or ii) no activation.

The number of output channels of a block $B_i$ is $2^{(3+i+cI)}$, where cI is channel increase parameter of the block. Parameter cI is a non-negative integer.

Every block has a parameter expansion factor (eF). The number of output channels for every intermediate edge of a block equals to $eF*2^{(3+i+cI)}$. Parameter eF is a positive real number. Intermediate edge output channel is an output channel of any edge except the last one of the block.

The first block of a (each) stage differs from all other blocks. It has stride 2 in the first non-identity edge and skip type=noSkip.

Figure 5:
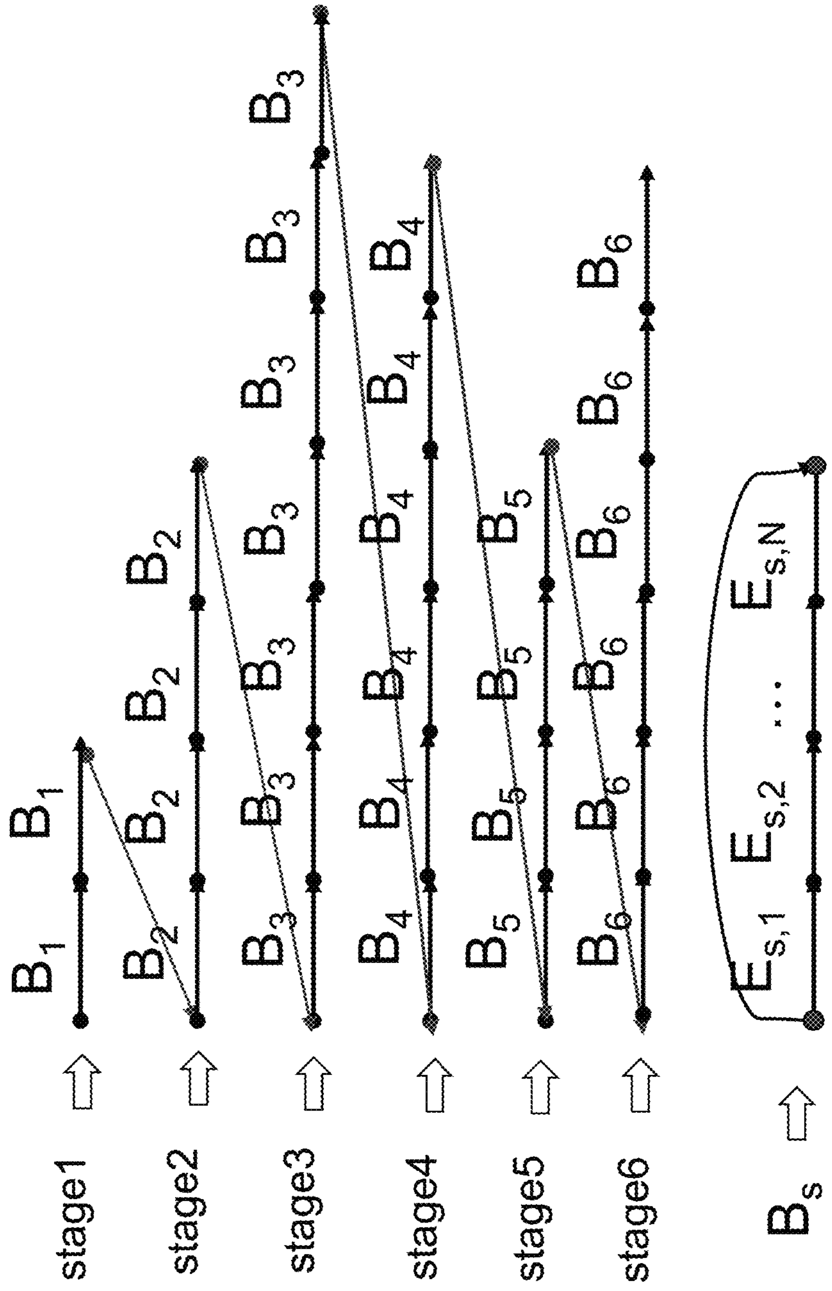
FIG. 5 is a block diagram illustrating a high level architecture satisfying the conditions for design of a search space.
Figure 6:
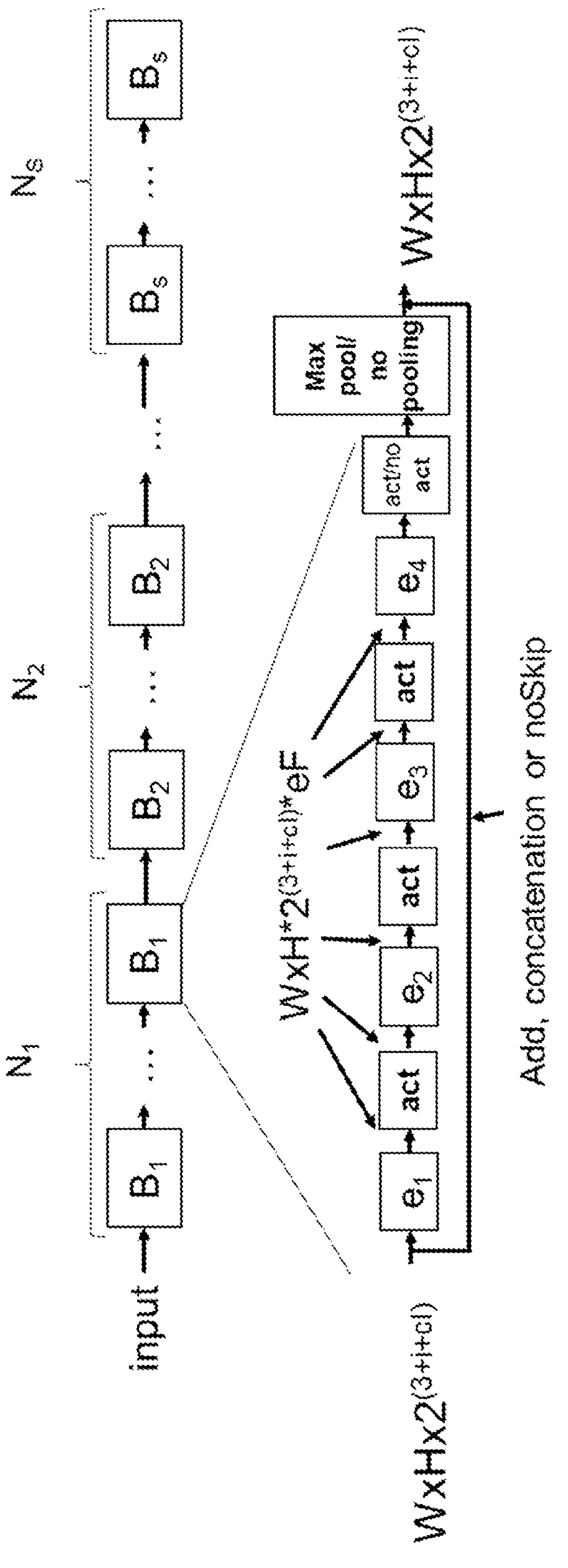
FIG. 6 is a block diagram illustrating a structure of a block.

An exemplary neural network architecture graph description of a search space and a detailed exemplary architecture structure can be found on FIG. 5 and FIG. 6.

FIG. 5 shows an exemplary architecture with 6 stages. This satisfies a more detailed condition that there are three or more stages (not limited to the exemplified six stages, the number of stages S may be e.g. S=5 or larger than 6), where spatial data size (width and height) is the same throughout the stage. Each of stages i=[1 . . . S] contains $N_i \geq 1$ (e.g. $N_5=6$ as in stage 4 and 6 in the figure) blocks of identical (for stages of specific architecture) structure. As can be seen in the figure, the number of blocks per stage may differ or may be the same. Each block in stage i=[1 . . . S] contain one or more edges (operations), e.g. $E_5=4$. Different blocks in one architecture may contain different number of operations (edges). For stages i=[2 . . . S] at least two different types of blocks are be used to improve generalization ability and to capture different patterns in data. As mentioned above, each operation may be, for example, convolution with square kernel (K×K), e.g. 1×1, 3×3 or 5×5 or pair of convolutions with non-square kernels (K×1+1×K or vice versa), e.g. 3×1+1×3.

FIG. 6 shows in the upper part the sequence of the blocks within stages of the processing pipeline. An exemplary structure of the block $B_1$ is illustrated. In particular, the edges (operations) $e_1$, $e_2$, $e_3$, and $e_4$ are convolutions with a kernel out of a list of possible (predefined) kernel sizes. Each convolution may have the follow-up normalization operation (e.g. BatchNorm, not shown) and activation (e.g., ReLU, etc), shown as “act” in the figure. The last edge $e_4$ does not necessarily need to be followed by the activation, but can be (illustrated in the figure as “act/no act”) —in other words, the blocks may differ in this respect and some of the blocks may have the activation and some of the blocks do not need to have the activation after the last convolution edge. The block may, but does not have to terminate with a pooling laver.

It is noted that one of operations in the first block of each stage should have stride≥2 or be a SpaceToDepth operation. In this case residual connection may be not used for this block. SpaceToDepth operation rearranges blocks of spatial data, into depth. In some embodiments, this operation outputs a copy of the input tensor where values from the “height” and “width” dimensions are moved to the “depth” dimension. For example SpaceToDepth with stride 2 converts input tensor od shape (2H,2W,C) to output tensor of shape (H,W,4C) by just reshaping every tensor of shape (2,2,1) to output tensor of shape (1,1,4).

Base number of channels for stage i∈[1 . . . S] is computed as $2^{3+i+cI}$ where cI (channel increase) is a non-negative integer number. It is one of the search space parameters which is defined for each stage separately, e.g. cI=1. Internal channels (i.e. all but input channels of the first operation in a block and output channels of the last operation in the block) in each block of a certain stage may be multiplied by the value of eF (expansion factor) which is a positive real value, e.g. eF=2, as schematically illustrated in FIG. 6.

Each convolution may be a group convolution. A group convolution is a type of convolution, which splits input tensor of size (H,W,C_in) to nGroup tensors of size (H,W, C_in/nGroup). For every sub-tensor of size (H,W,C_in/nGroup), a separate convolution of size (K,K, C_in/nGroup, C_out/nGroup) is applied. Output of size (H,W,C_out) is obtained by stacking outputs of the nGroup convolutions. An advantage of group convolution is less parameters and less operations in comparison with a regular convolution. A disadvantage is less generalization ability and a complex process of splitting and stacking as mentioned above. This process is not always hardware efficient. In case of group convolution, for each convolution group, a group number (nGroup) may be set separately, but a group size (number of channels divided by nGroup) should be a multiple of $2^k$, where k is a positive integer value, e.g. k=4. In particular, it may be advantageous if both $$\frac{C_{in}}{nGroup} \text{ and } \frac{C_{out}}{nGroup}$$

are multiple of $2^k$.

Any of the convolutions may have a weight standardization operation or its variant without division by standard deviation. Each block may have a skip (residual) connection of any element-wise type or concatenation (e.g. addition, multiplication, or the like).

Specialized hardware-friendly tensor-decompositions (e.g. Tensor-Train convolution) of operations may be used as an operation alternatively to regular convolutions. Another alternative to regular convolution is are some special hardware-friendly sparse representations of convolution. The above-mentioned Tensor-Train convolution is described in detail, e.g., in Garipov et. al. "Ultimate tensorization: compressing convolutional and FC layers alike", available at https://arxiv.org/abs/1611.03214.

The above-exemplified constraints provide for limitation of the search space size and for determination of the search space which still includes architectures suitable for hardware implementation, such as an NPU implementation. Once the search space is determined, the search may be performed.

The determination of the search space may include as a preceding step, a selection of a particular design of the search space. According to an embodiment, the determining the search space includes selecting a design of search space with one or more constraints on composition or order of blocks within a NN architecture. Moreover, the design of search space is selected out of a set of designs of search space based on a function of said measure calculated for a plurality of architectures pertaining to said design of search space. The function may be e.g. an average as shown above in case of mMEM. However, the present disclosure is not limited to average and other function such as maximum, minimum or any other norm or statistic measure (e.g. variance or the like) may be used. The plurality of architectures may be randomly picked out of the candidate design of search space.

Once the search space is determined, the search may proceed. The present disclosure is not limited to any particular search. Nevertheless, in the following one suitable and efficient search procedure is described. According to an embodiment, the searching for the one or more NN architectures comprises performing K times, K being a positive integer (one or larger than one), the following steps:

- pseudo-randomly selecting a first set of candidate architectures from the search space;
- obtaining a second set of candidate architectures by removing from the first set of candidates those candidate architectures which do not satisfy a predefined condition including latency and/or accuracy; and
- training each candidate architecture of the second set and determining a quality and a latency of said trained candidate architecture.

It is noted that pseudo-randomly should not limit the present disclosure, it is conceivable, to perform the selection also based on a true random function. However, a simple implementation employing a pseudo-random generator is sufficient. After the training of each candidate architecture of the second set and determining a quality and a latency of said trained candidate architecture, the suitable architectures may be selected. For example, one or more of the architectures best in terms of a cost function including the quality and the latency may be selected.

On the other hand, the search may further continue. According to an exemplary implementation the searching for the one or more NN architectures further includes:

- selecting, from the second set, a third set of candidate architectures according to the determined quality and latency of the candidate architectures in the second set;
- applying a scaling procedure to each of the candidate architectures in the third set resulting in a fourth set of scaled candidate architectures;
- training each of the scaled candidate architectures of the fourth set;
- evaluating quality and/or latency each of the trained scaled architectures of the fourth set (this may be performed, for example based on some evaluation set of input data such as input images if the task of the neural network is image processing of any kind); and
- selecting, based on the evaluation, from the trained scaled candidate architectures of the fourth set, a fifth set of architectures as a result of said searching step.

Figure 7:
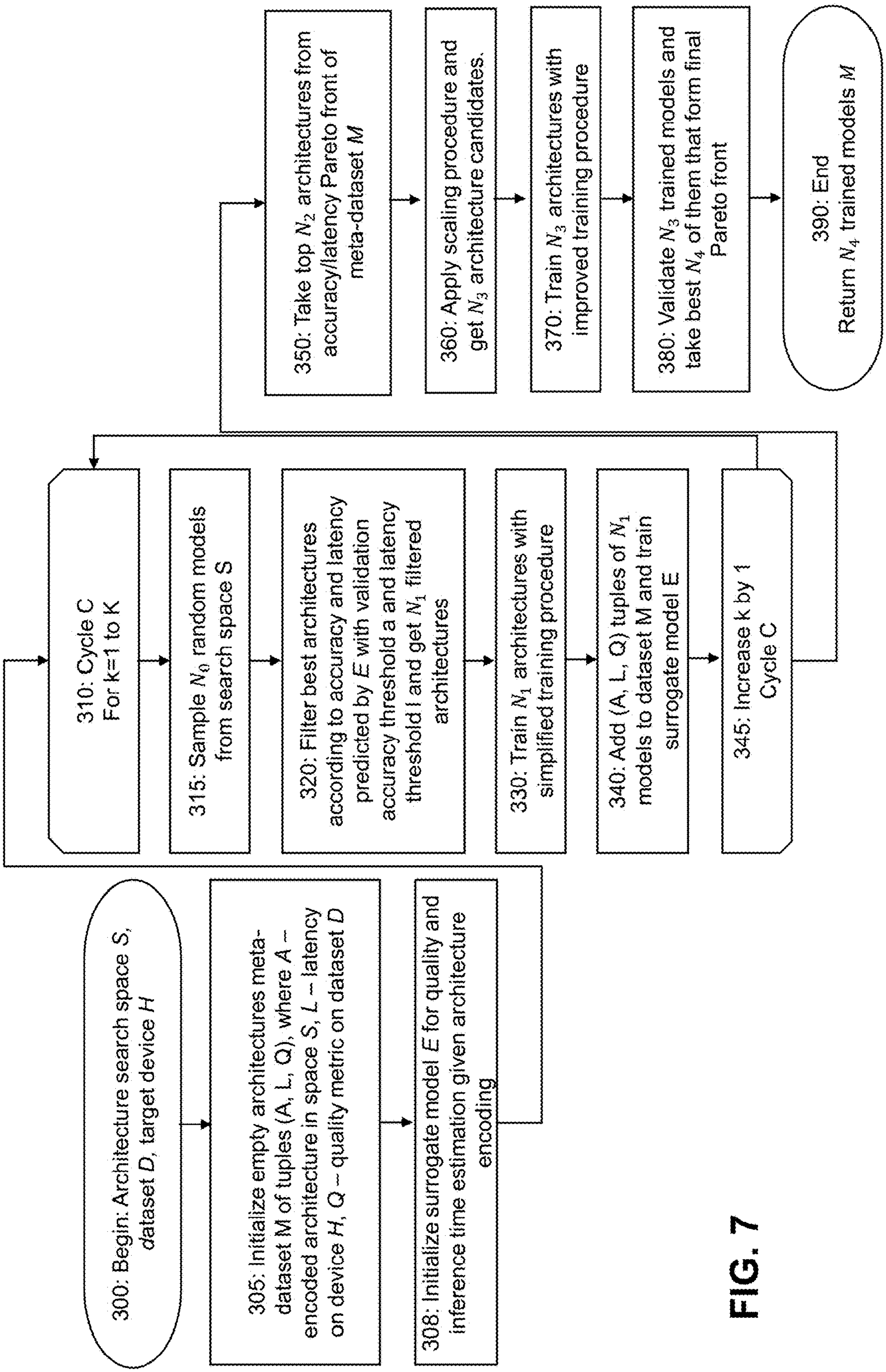
FIG. 7 is a flow chart illustrating an exemplary search procedure within a given search space.

FIG. 7 illustrates an exemplary search procedure in more detail. FIG. 7 is related to an NPU-friendly search algorithm. This search algorithm has as an input a search space, which may be the search space determined based on design of search space, e.g. search space criteria discussed above, e.g. with reference to FIGS. 5 and 6.

Step 300 represents the beginning of the search. Apart from the input search space S, a target device H may be provided as an input alongside with a data set D for training and/or evaluating the architecture performance. Step 305 includes some initializations. For example, an empty set of architectures may be provided which can be seen as a meta-dataset M of tuples (A, L, Q), where A is an encoded architecture in the search space S, L is a latency of the architecture A on the device H, and Q is a result of a quality metric on dataset D for the architecture A. In step 308, a surrogate model is initialized. The surrogate model E serves for quality and inference time estimation for a given architecture encoding. The surrogate model estimation may be used as a predefined condition for k>1 step of the search algorithm. The term meta-dataset here refers to a dataset of architectures rather than a dataset of e.g. training data. The term "encoded" architecture refers to the description ("encoding") representing an architecture from a search space. Such description may include the specific operations used in block, specific number of blocks in every stage, specific number of stages and so on. This description then may be encoded e.g. to a vector representation. According to an exemplary implementation, the surrogate model may be a NN, e.g. a neural network F. It takes as an input encoded representation of A and its target is to learn, how L and Q depend on A; [L,Q]=F(A). F is the NN and may be, e.g. of the LSTM-type, i.e. Long short-term memory, which is an artificial recurrent neural network (RNN) architecture. However, the present disclosure is not limited to this particular example of the surrogate model. In general, the surrogate model may be implemented by another kind of a neural network or by another processing (estimation) model. An example of the possible processing (estimation) model may be some classical machine learning approaches such as Random Forest or Gradient Boosting or the like.

Step 310 correspond to cycle C which is repeated K times for k=1 . . . K. In the cycle, in step 315. No random models are selected from the search space S. This may be seen as a random sampling of the search space S. Here, the term "random" may be pseudo-random for simple and practical implementations, as mentioned above. The selected $N_0$ random models form the above mentioned first set of candidate architectures. In step 320, architectures of the first set are filtered to obtain best architectures. The filtering may be performed according to the accuracy and latency predicted by the surrogate model E. In particular, the filtering may consist of discarding from the first set architectures which do not satisfy a validation accuracy threshold a and a latency threshold 1, thereby obtaining the second set of $N_1$ filtered architectures. Thresholds a and I may be determined based on the requirements of the device H or in another manner, e.g. empirically or the like. According to an exemplary implementation, the target latency and target accuracy may be specified as latency and accuracy of some existing architectures. For example latency and accuracy of ResNet-50, ResNet-34, ResNet-18 or other architectures or designs. In step 330, the $N_1$ architectures of the second set are trained. For example they may be trained with a simplified training procedure (e.g. with a small subset of the training dataset, and/or less number of training epochs or the like) in order to improve the efficiency of the search.

After the training 330, in step 340. (A, L, Q) tuples of the trained $N_1$ models are added to the dataset M and the surrogate model E is trained accordingly. Then, the k is increased by one and the cycle C (step 310) including steps 315, 320, 330, and 340 are repeated. After the K repetitions of the cycle C, there is a set M of the trained candidate architectures. The third set of architectures may then be formed in step 350, e.g. by including therein the top $N_2$ architectures from the accuracy/latency Pareto front of the meta-dataset M.

The selection of best architectures from Pareto-front in terms of accuracy/latency may be performed by at first choosing target latency interval (for example L_max–latency of ResNet-50 and L_min–latency of ResNet34). Then, architectures are considered that have latency more, than L_min and less than L_max to form an A_set. Architecture from the A_set are ordered so that A1 better than A2 if L(A1)<L(A2) and Q(A1)>Q(A2). The A_best architectures are selected which means that a subset of the A_set is selected such that an architecture a will be in the A_best if there is no another architecture a' in the A_set such that a' would be better then a. However, the present disclosure is not limited to such selection of best architectures. As is clear to those skilled in the art, some measure including, possibly weighted, latency and/or quality may be applied to select the desired number of architectures which are best according to that measure.

In step 360, a scaling procedure is applied to the third set, and $N_3$ scaled architecture candidates are obtained, forming the fourth set. An exemplary scaling procedure will be described in detail below. In step 370, the $N_3$ scaled architectures are trained with an improved training procedure. The term "improved" refers to the fact that this training procedure may be a better performing and more complex training in comparison to the training of step 330. For instance, the improved training may employ different hyperparameters and further techniques ("training tricks") to improve quality, such as augmentation, longer training. Deep Mutual Learning, weights averaging or the like.

In step 380, validation of the $N_3$ trained models is performed. Validation may be performed, e.g. by testing the trained models with a test (validation data set). A result of validation for each trained model is the latency and/or the accuracy. Based on the result, best $N_4$ of the trained models are taken, that form a final Pareto front. The best $N_4$ of the trained models correspond to the fifth set mentioned above.

It is noted that the selection of the best architectures in steps 350 and/or 380 may be performed in a manner different from the Pareto front. For example, a predefined number of best architectures can be selected. The "best" architectures may be best according to a predefined cost function which may include terms for latency and/or accuracy or the like.

Step 390 represents the end of the search procedure and returns the $N_4$ trained models M.

Hardware-Friendly Scaling

In the above described search algorithm, a scaling is performed. It is noted that in general the present disclosure is not limited to approaches which employ the scaling. However, in the following a scaling approach is described, which may contribute to a higher efficiency of the search. This scaling algorithm may be used in addition to the search space determination and/or the search as described above. However, the scaling algorithm may be also used with any other determinations of the search space and search algorithms.

In particular, according to an embodiment, a scaling procedure for a candidate architecture A out of the third set comprises performing one or more times the following steps.

- executing the architecture A on a desired target device, to measure latencies for respective blocks of the architecture A.
- determining a subset of candidate scaled architectures, including the blocks of the architecture A, according to the measured latencies, wherein the subset includes those candidate scaled architectures which have latency within a predetermined range;
- training the candidate scaled architectures of the subset; and
- selecting among the candidate trained scaled architectures of the subset one or more best trained scaled architectures and include them into said fourth set based on at least an inference accuracy.

The rescaling procedure is performed for a particular architecture A. The above mentioned design based on blocks and stages may provide for an easy scalability e.g. by increasing the number of blocks in the stages. However, it is noted that the present rescaling is also applicable for architectures which do not distinguish stages or blocks as described in the above mentioned constraints. In the above example, the subset of candidate scaled architectures includes those architectures which have latency in a certain range. However, this is only an exemplary implementation. It is conceivable to provide another or additional criteria, such as estimated accuracy or the like. Moreover, the sub-set does not have to be selected. The training may be performed for all architectures of the third set. There may be a threshold on the number of architectures in the third set. If exceeded, the determination of the sub-set would be performed, otherwise, all of the architectures in the third set would be trained.

According to an exemplary implementation, the step of the determining the subset of candidate scaled architectures comprises selecting, among possible scaled architectures, a plurality of scaled architectures which include each block of the architecture A in at least one stage, wherein the sum of a block latency multiplied by the number of stages said block is in for each block is within the predetermined range. The selecting of the plurality of scaled architectures may be performed such that all architectures are selected or all those architectures are selected which satisfy an additional constraint. Such constraint may be, e.g. a constraint on the number (amount) of stages and/or a number (amount) of blocks per stage.

For example, the predetermined range is given by a desired target latency and a latency error margin specifying by how much a latency of a scaled architecture is allowed to deviate from said desired target latency.

The scaling may be performed iteratively, a multiple times e.g. for different numbers of stages and/or different target devices. It is noted that the term "iteratively" herein means that the output of previous iteration is used as input for next iteration. For example, a scaled architecture obtained in step n is an input to a further scaling in step n+1.

Figure 8:
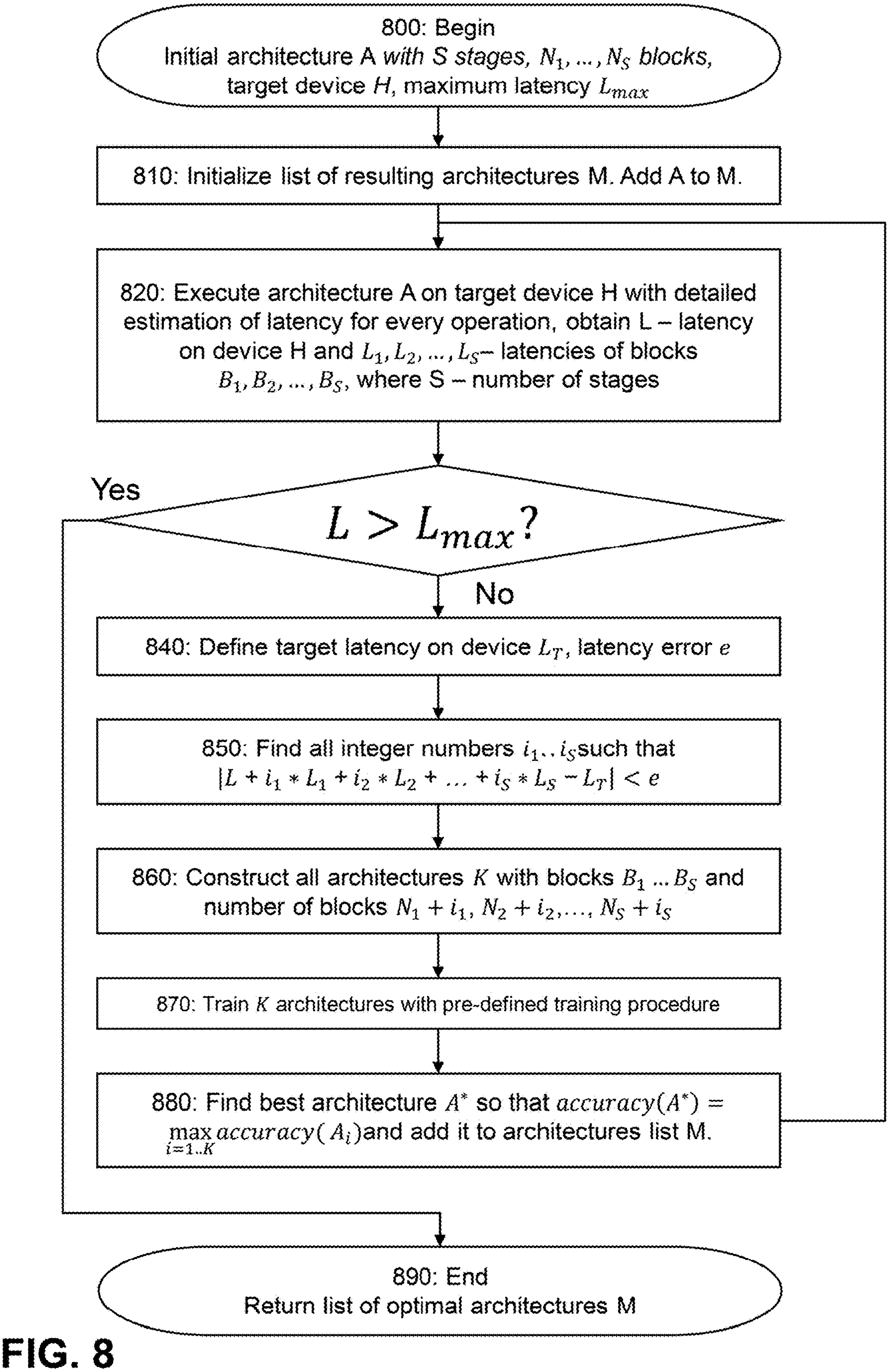
FIG. 8 is a flow chart illustrating an exemplary architecture scaling procedure.

A detailed exemplary scaling procedure is described below with reference to FIG. 8. FIG. 8 is a flow chart. Step 800 marks the beginning of the procedure. The input data is an initial architecture A with S stages, N1, . . . , $N_s$ blocks, target device H, and maximum latency $L_{max}$. The maximum latency $L_{max}$ may be a predefined parameter, defined before the scaling procedure is performed. It may be a design parameter of the scaling.

In step 810, the initialization of a list of resulting architectures M is performed. Architecture A is added to M. The set M may be a finite list but extendable, it is not important when the search ends in this example, any architecture fulfilling the constraints is tested.

In step 820, architecture A is executed on a target device H, including a detailed estimation of the latency for every operation. The total latency L may be obtains, wherein L is the total latency on device H (equal to the sum of the block latencies of all blocks in the architecture A) and L1, . . . , $L_S$ are latencies of respective blocks $B_1$, . . . , $B_S$, where S is the number of stages of architecture A.

If $L>L_{max}$, the procedure ends, because the scaled architecture does not fulfil the latency condition. If L is not greater than the maximum latency, then the procedure continues with step 840. Accordingly, a target latency $L_T$ on the target device is defined and a latency error e is defined. In step 850, all integer numbers $i_1$, . . . , $i_S$ are found, such that:

$$|L+i_1*L_1+ \dots +i_S*L_S-L_T|<e$$

In other words, the number of blocks is increased to scale up until the latency is close to the target latency. The target latency $L_T$ may be defined as an intermediate latency, between L and $L_{max}$. For example, the $L_T$ may be obtained by dividing $(L_{max}-L)/4$ to obtain the distance between a plurality of target latencies $L_T$ to obtain architectures fulfilling various different target latencies. This is because the architectures may differ in quality, and architectures with higher latencies may have better accuracy/quality criteria. However, it is noted that this is only an example and the present embodiment is not limited to provision of multiple target latencies.

In step 860, all architectures A1, . . . , $A_K$ are constructed with blocks $B_1$, . . . , $B_S$ and the numbers of blocks $N_1+i_1$, . . . , $N_S+i_S$. Then, in step 870, the K architectures $A_1$, . . . , $A_K$ are trained with a pre-defined training procedure. In step 880, best architecture A* is found so that:

$$\text{accuracy}(A^*)=\max_{i=1, \dots ,K} \text{accuracy}(A_i)$$

and the best architecture is added to architectures list M. The best quality architecture for the target latency is thus found based on the accuracy. However, accuracy is only one possible and exemplary criterion. The same steps 820 to 880 are performed for further architectures. The algorithm terminates in step 890, and may return the list of the resulting architectures M.

In brief, hardware-friendly architectures can be obtained by scaling algorithm which allows to obtain large and accurate architectures from faster architectures, while keeping Pareto-optimality. The scaling algorithm incudes the following steps:

1. Initialization: Input data is an initial architecture A with S stages, $N_1$, . . . , $N_S$ blocks, target device H, maximum latency $L_{max}$.
2. Initialize list of resulting architectures M. Add A to M.
3. Execute architecture A on target device H with detailed estimation of latency for every operation, obtain L—latency on device H and $L_1$, $L_2$, . . . , $L_S$—latencies of blocks $B_1$, $B_2$, . . . , $B_S$, where S—number of stages.
4. If $L>L_{max}$ go to step 11, else go to step 5.
5. Define target latency on device $L_T$, latency error e.
6. Find all integer numbers $i_1 \dots i_S$ such that $|L+i_1*L_1+i_2*L_2+ \dots +i_S*L_S-L_T|<e$.
7. Construct all architectures K with blocks $B_1 \dots B_S$ and number of blocks $N_1+i_1$, $N_2+i_2$, . . . , $N_S+i_S$.
8. Train K architectures with pre-defined training procedure.
9. Find best architecture A* so that $$\text{accuracy}(A^*) = \max_{i=1 \dots K} \text{accuracy}(A_i)$$

and add it to architectures list M.

10. Go to step 3.

11. Terminate algorithm and return the list of resulting architectures M.

According to the above described embodiments and examples, a method is provided for estimation of hardware-friendliness of network architecture search space—Matrix Efficiency Measure (MEM). Moreover, an NPU friendly search space is provided, which has NPU friendly operations, wide range of block lengths, wide range of stage length, NPU friendly number of convolutional channels, NPU friendly vector operations, and not fixed block length and block structure. Finally, an NPU friendly scaling method is provided, which has more flexibility then a compound scaling, a precise estimation of latency for scaled architecture, as well as less search complexity of scaled architectures.

As mentioned above, for specialized devices such as NPUs, FLOPS measure is too abstract and often does not reflect real latency of the model. According to the present disclosure, for some embodiments, hardware constraints can be taken into account during model's architecture design, as is shown in the exemplary embodiments described below. The constraints may be taken into account during the search space determination and/or during the search.

In general, neural network architectures using matrix multiplications may be implemented efficiently on an NPU. The above discussed MEM is designed to consider the matrix multiplication in latency. However, it may be that smaller input matrixes (e.g. with one of dimensions less than 16) are less efficient for the hardware than larger matrices. Vector operations with large data may be less efficient. Also, some more complex activation functions such as SWISH or sigmoid may be less efficient. On the other hand, the ReLU may be more efficient. Input/output data transfer limitations may be given by the hardware internal memory size or the like. In general, neural networks may include: fully connected layers or convolution layers, which are both efficient on the NPU. On the other hand, depth-wise convolution may be less efficient. Batch normalization (vector operation) can be fused with convolution or with a fully connected layer operation, in order to improve the efficiency. However, separate batch normalization not very efficient. These considerations already provides for some possible constraints on the neural network architectures as discussed above with reference to MEM.

According to an exemplary implementation, an NPU-friendly neural architecture search space is provided. The design of such search space is driven by minimization or reduction of vector operations and data transfer and use of highly efficient operations that can be reduced to matrix multiplications.

The mMEM characteristics for the herein suggested design of search space (ISyNet-N), as well as for known designs of search space ResNet, MobileNetV2, and MNasNet is shown in Table 2 below.

TABLE 2

Comparison of performance estimated by mMEM for various designs of search space.

| Design of search space | #sampled architectures (K) | Mmem |
|---|---|---|
| ResNet | 1000 | 0.264 |
| MobileNetV2 | 100 | 0.124 |
| MNasNet | 100 | 0.133 |
| ISyNet-N | 3800 | 0.349 |

ISyNet-N is an overall method of neural architecture design including the search space, method of search, and scaling method as will be described below. The higher mMEM number means a better design of search space, because the higher MEM, the more effectively the NPU is used. The NPU designed to effectively make matrix operations, so percent of matrix operations should be higher.

It is noted that in Resnet, every block includes 2 convolutional operations and 1 skip-connection. Every skip-connection requires memory and vector operations. In the suggested ISyNet-N search space, number of convolutional operations in one block is not limited and skip-connection and is not mandatory, so the search space is better balanced. For MobileNet and MnasNet, not NPU-friendly depth-wise convolutions, Squezze and excitations operations are employed which reduce the efficiency on the NPU.

Figure 9:
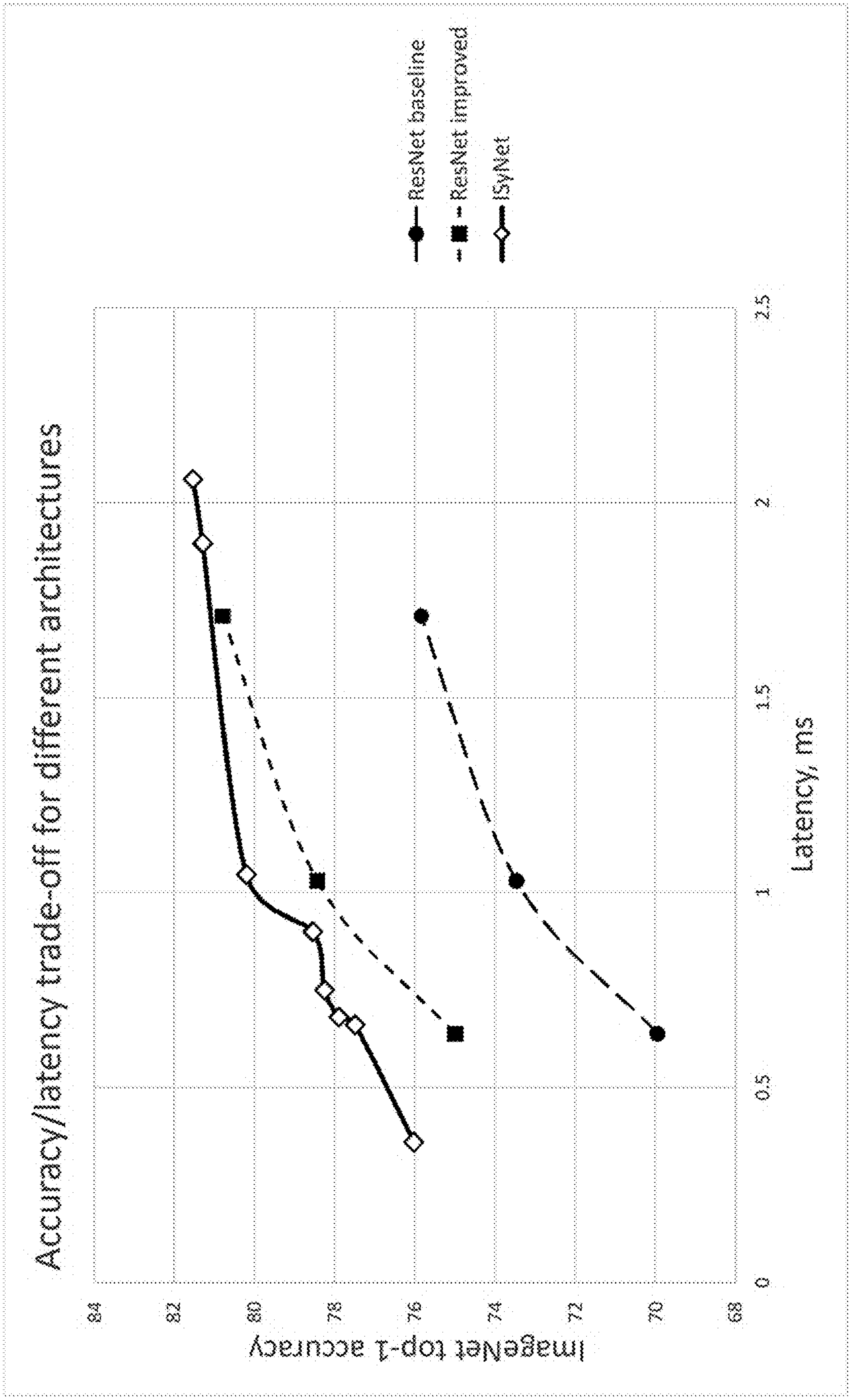
FIG. 9 is a graph showing performance of different architectures in terms of latency and accuracy.

FIG. 9 is a graph that shows in the x-axis latency (time of inference) of different architectures on an NPU device (the lower the latency, the better). The y-axis shows top-1 accuracy on validation part of the ImageNet dataset (the higher the accuracy, the better). Top-1 accuracy here means a ratio of the amount of images where correct class has highest probability to total number of images. The obtained architectures from the above described search space obtained with the NPU friendly multi-criteria search algorithm and scaled with NPU friendly scaling algorithm outperform all known architectures on Pareto front for ImageNet classification dataset.

ResNet baseline refers to a ResNet architecture trained with a simplified training procedure, whereas ResNet improved refers to an improved training procedure applied to train the network. For simplified (baseline) training procedure following setup was used:

- SGD (stochastic gradient) optimizer with a momentum 0.9 and weight decay 1e−4.
- Linear learning rate warmup from 0 to starting level for the first 5 epochs.
- Starting learning rate 0.1.
- Learning rate decrease with decay coefficient 0.1 every 30 epochs.
- In total 90 epochs.
- 1 GPU (Graphics Processing Unit) used for training.
- Batch size 128.

For improved training procedure the following setup was used

- SGD optimizer with momentum 0.9 and weight decay 1e−4.
- Linear learning rate warmup from 0 to starting level for the first 5 epochs.
- 550 epochs with exponential learning rate decay, multiplying it by 0.97 every 2.4 epochs.
- 8 NVidia V100 GPUs, total batch size 1024.
- Random Augmentation.
- Weight Standardization.
- Exponential moving average of model weights with coefficient 0.9999.
- Deep mutual learning.
- Batch normalization after the last fully-connected layer.

Figure 10A:
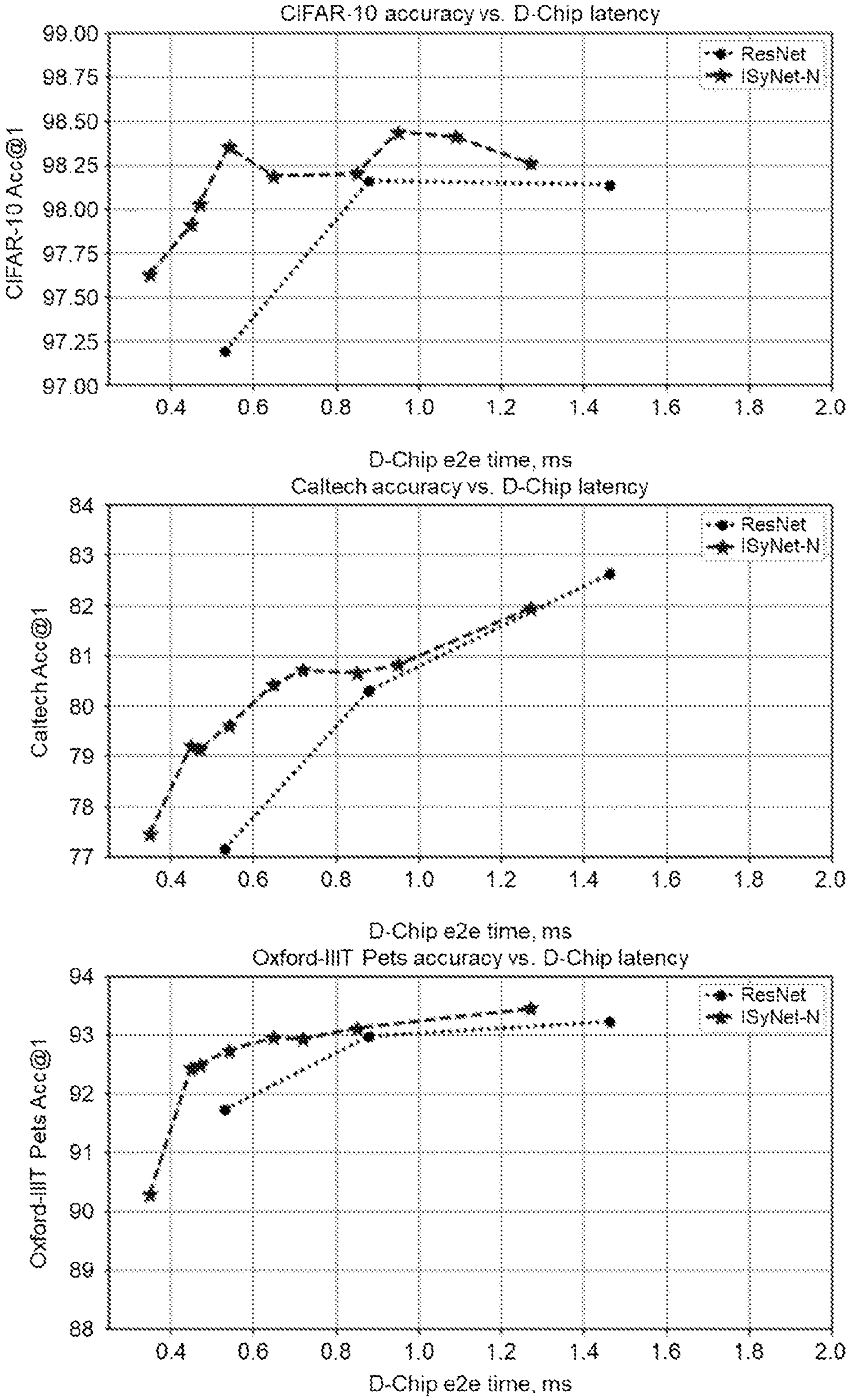
FIGS. 10A-10C show graphs showing performance of different architectures in terms of latency and accuracy for different evaluation data sets.
Figure 10B:
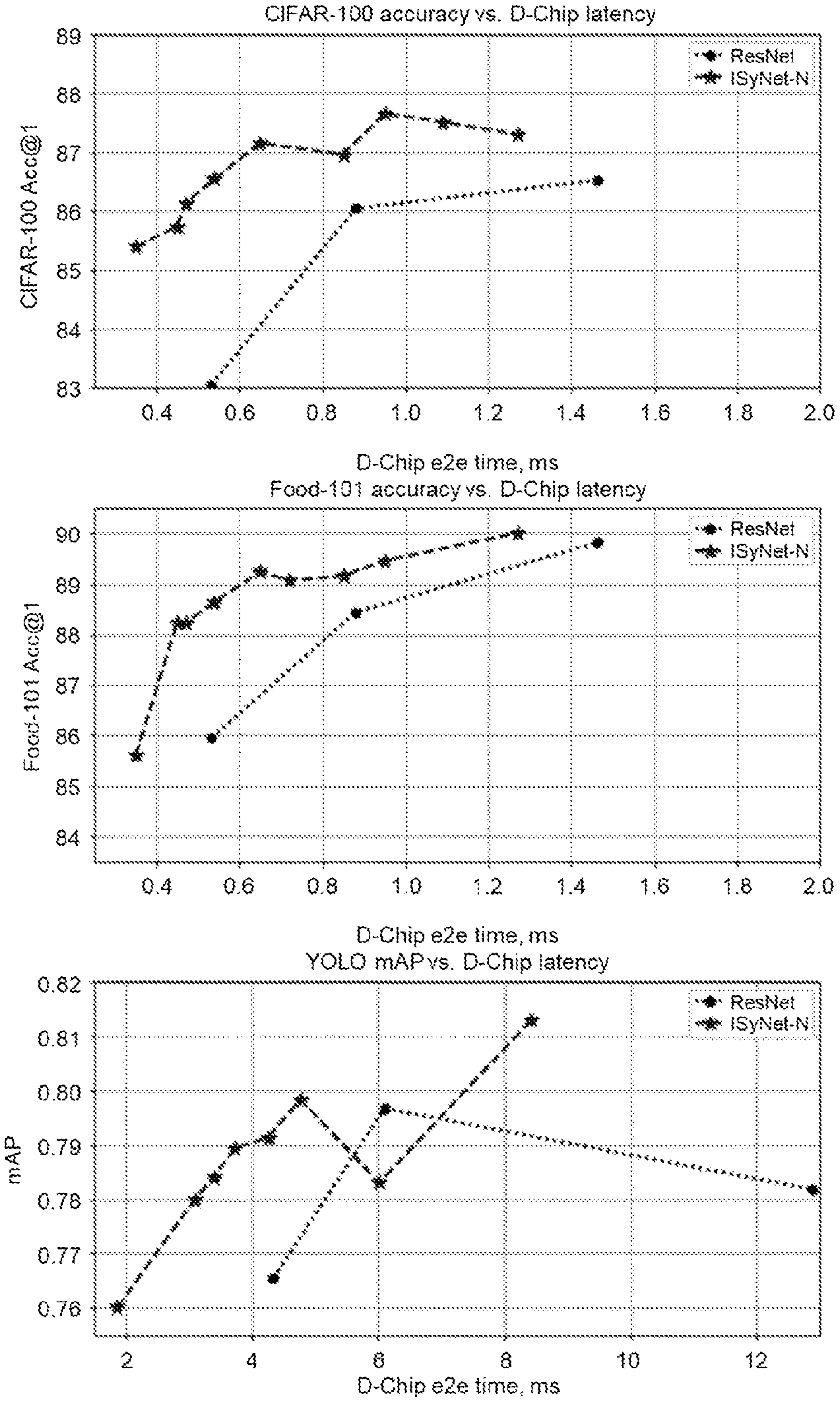
Figure 10C:
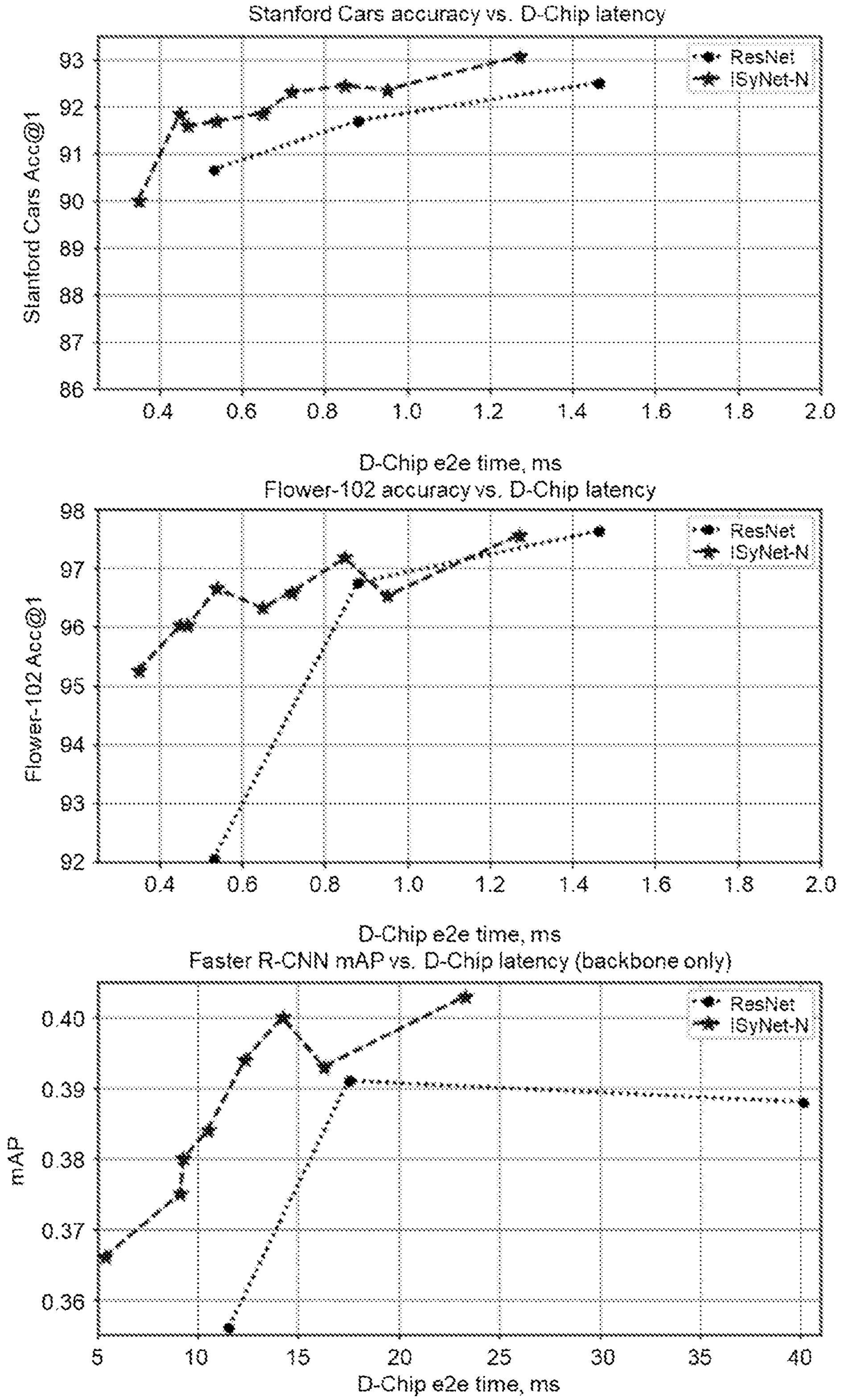

FIG. 10 shows results of architectures pre-trained on ImageNet dataset and fine-tuned on 9 other datasets and computer vision tasks, including classification (CIFAR-10, CIFAR-100, Stanford Cars, Caltech, Food-101, Flower-102, Oxford-IIIT Pets) and object detection (Pascal VOC, as backbone for YOLO detector and MS COCO, as backbone for Faster R-CNN detector). On the majority of tasks ISyNet outperform the baseline ResNet, which mean that designed architectures are valuable and can be applied for many real world computer vision problems.

Figure 11:
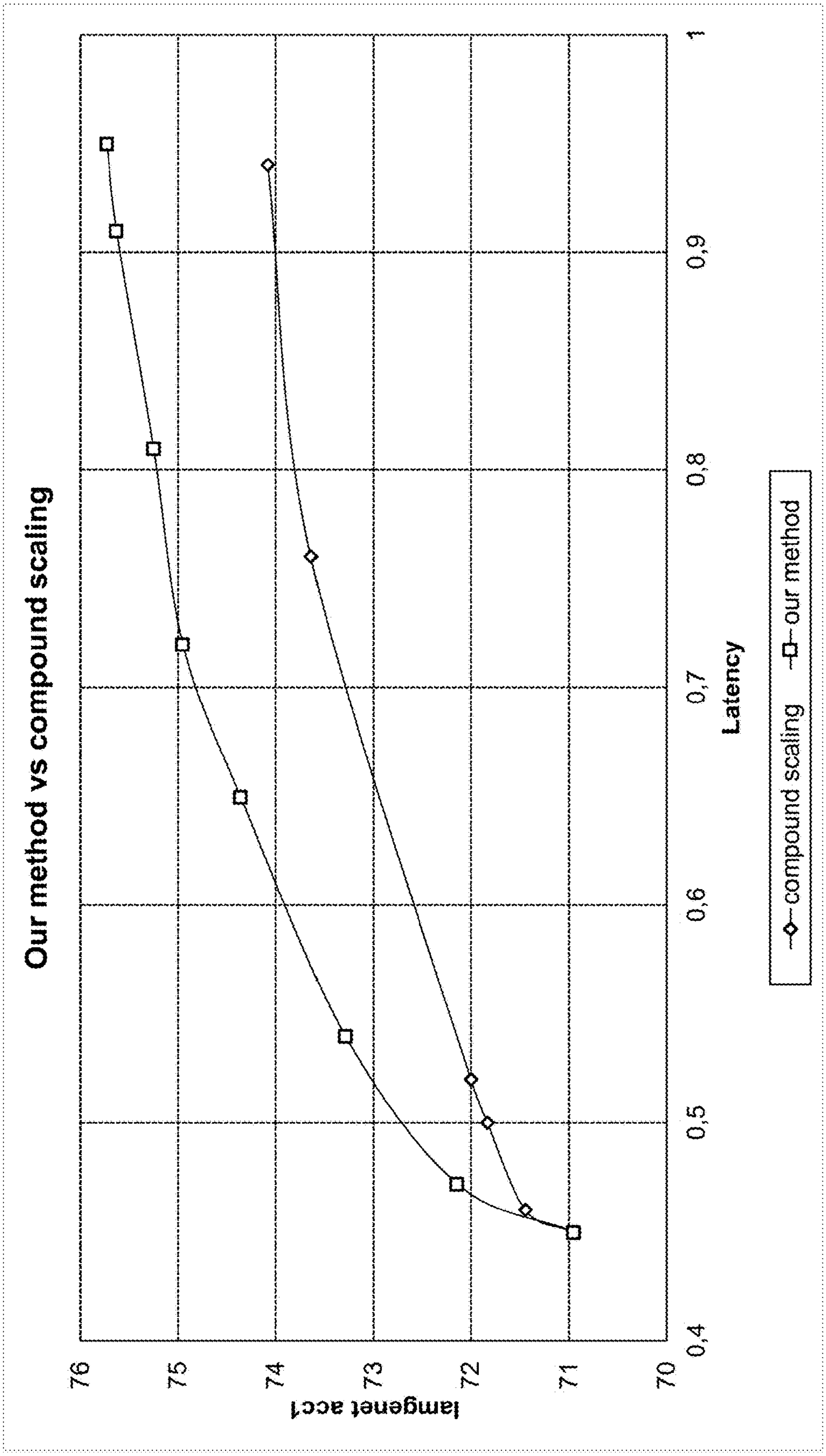
FIG. 11 is a graph comparing the results of scaling as described in an embodiment with the results of compound scaling, the results being in terms of latency and accuracy.

FIG. 11 shows an advantage of the above described NPU friendly scaling algorithm over an existing compound scaling algorithm.

Hardware Friendly Neural Network Architectures

We present a method of search for neural networks architectures together with set of found architectures that have high accuracy and low latency on NPU devices:

- The novel measure of hardware friendless for network architectures search space—Matrix Efficiency Measure (MEM).
- Hardware-friendly architectures search space that reduce cost of search of architectures and allow to obtain fast and accurate Neural network architectures.
- Efficient scaling approach to transform lightweight models to slower but more accurate, keeping optimal tradeoff between accuracy and speed.
- Highly optimized architectures trained on ImageNet dataset and proven to be accurate on other downstream datasets and tasks.

Some of the optimized architectures are provided below. As these architectures have been trained on ImageNet data set, they are suitable for processing of image data and can be readily used in image classification tasks, e.g. for object detection and recognition, image filtering, image coding or the like. Such image processing may also be applied for video.

In particular, in the following, a set of Pareto-optimal CNN backbone architectures is provided. Each of them provides different trade-off between accuracy and latency on the NPU hardware. The following notation is used for stages of the architectures:

$stage_i$(N, cI, eF): $o_1$; $n_1$; $a_1$–$o_2$; $n_2$; $a_2$— . . . –$o_E$; $N_E$; $a_E$|s which means that i-th stage of an architecture comprises of N blocks with E operations ($o_1$, $o_2$, . . . , $o_E$), with following-up normalization operations ($n_1$, $n_2$, . . . , $n_E$) and activations ($a_1$, $a_2$, . . . , $a_E$). Skip connection type s is used. Values cI being the channel increase factor and eF being expansion factor are used.

Example of operations: conv1×1, conv3×3, conv5×5-convolutions, conv1×3_3×1—pair of non-square convolutions, gconv3×3_4—group convolution with 4 groups and kernel 3×3.

Example of normalizations: BN (BatchNorm), GN (GroupNorm).

Example of activations: ReLU, Leaky ReLU, sigmoid, no activation.

Example of skip connections: add (elementwise addition), cat (concatenation), no (skip connection not used).

For all presented architectures, downsampling blocks for which stride value is more than 1 do not have skip connections.

The neural networks are here referred to (called) as "ISyNet". This is only a label to distinguish this architecture design from other architecture designs. In other words, the term "ISyNet" is here used to denote the search space design. When accompanied with a number or numbers in parentheses, a particular selected architecture of the ISyNet search space design is meant. The number here is also a label distinguishing the particular architectures.

Convolutional neural network ISyNet-NO (№ 916) with 5 stages, comprising of:

Stage1(1, 0, 1): conv5×5; BN: ReLU|add.

Stage2(2, 0, 1): conv3×3: BN; ReLU-conv3×3: BN; ReLU|add.

Stage3(4, 0, 1): conv3×3: BN: ReLU-conv3×3: BN; ReLU-conv1×1: BN; ReLU-conv1×1: BN: ReLU|add.

Stage4(2, 0, 1): conv1×1; BN; ReLU-conv3×3; BN: ReLU|add.

Stage5(6, 0, 1): conv3×3; BN; ReLU-conv3×3; BN; ReLU-conv1×1; BN; ReLU|add.

For example, in the above mentioned notation, Stage5(6, 0, 1) means that Stage 5 has six blocks, each of which has the operations conv3×3: BN; ReLU-conv3×3; BN; ReLU-conv1×1; BN; and ReLU|add.

Convolutional neural network ISyNet-N1 (№ 803), comprising of:

Stage1(1, 0, 1): conv7×7; BN; ReLU|add.

Stage2(1, 0, 1): conv1×5_5×1: BN: ReLU-conv1×1: BN: ReLU-conv3×3: BN: ReLU-conv5×5: BN: ReLU|add.

Stage3(4, 1, 1): conv3×3; BN; ReLU-conv3×3: BN; ReLU-conv3×3; BN; ReLU|add.

Stage4(6, 0, 2): conv3×3: BN; ReLU-conv1×1: BN: ReLU-conv3×3; BN; ReLU|add.

Stage5(1, 0, 1): conv1×1; BN; ReLU-conv1×1; BN; ReLU-conv1×1; BN; ReLU|add.

Convolutional neural network ISyNet-N1-S1 (№ 803-1-4-6-3), comprising of:

Stage1(1, 0, 1): conv7×7; BN; ReLU|add.

Stage2(1, 0, 1): conv1×5_5×1; BN; ReLU-conv1×1: BN: ReLU-conv3×3; BN; ReLU-conv5×5: BN; ReLU|add.

Stage3(4, 1, 1): conv3×3; BN; ReLU-conv3×3; BN; ReLU-conv3×3; BN; ReLU|add.

Stage4(6, 0, 2): conv3×3: BN: ReLU-conv1×1: BN: ReLU-conv3×3: BN: ReLU|add.

Stage5(3, 0, 1): conv1×1: BN: ReLU-conv1×1: BN: ReLU-conv1×1: BN: ReLU|add.

The term "S1" or "S2" etc. in the label of the neural network distinguishes between neural networks obtained from the same base architecture by different scaling. The terms "N0", "N1", "N2" and the like in the label of the neural network roughly distinguish between the speed of the networks, e.g. N0 is faster than N1 and the like (the higher the number following "N", the slower the network).

Convolutional neural network ISyNet-N1-S2 (№ 803-1-5-6-6), comprising of:

Stage1(1, 0, 1): conv7×7: BN: ReLU|add.

Stage2(1, 0, 1): conv1×5_5×1: BN: ReLU-conv1×1: BN: ReLU-conv3×3: BN: ReLU-conv5×5: BN: ReLU|add.

Stage3(5, 1, 1): conv3×3: BN: ReLU-conv3×3: BN: ReLU-conv3×3: BN: ReLU|add.

Stage4(6, 0, 2): conv3×3: BN: ReLU-conv1×1: BN: ReLU-conv3×3: BN: ReLU|add.

Stage5(6, 0, 1): conv1×1: BN: ReLU-conv1×1: BN: ReLU-conv1×1: BN: ReLU|add.

Convolutional neural network ISyNet-N1-S3 (№ 803-1-6-8-7), comprising of:

Stage1(1, 0, 1): conv7×7: BN: ReLU|add.

Stage2(1, 0, 1): conv1×5_5×1: BN: ReLU-conv1×1: BN: ReLU-conv3×3: BN: ReLU-conv5×5: BN: ReLU|add.

Stage3(6, 1, 1): conv3×3: BN: ReLU-conv3×3: BN: ReLU-conv3×3: BN: ReLU|add.

Stage4(8, 0, 2): conv3×3: BN: ReLU-conv1×1: BN: ReLU-conv3×3: BN: ReLU|add.

Stage5(7, 0, 1): conv1×1: BN: ReLU-conv1×1: BN: ReLU-conv1×1: BN: ReLU|add.

Convolutional neural network ISyNet-N1-S4 (№ 803-1-7-10-8), comprising of:

Stage1(1, 0, 1): conv7×7: BN: ReLU|add.

Stage2(1, 0, 1): conv1×5_5×1: BN: ReLU-conv1×1: BN: ReLU-conv3×3: BN: ReLU-conv5×5: BN: ReLU|add.

Stage3(7, 1, 1): conv3×3: BN: ReLU-conv3×3: BN: ReLU-conv3×3: BN: ReLU|add.

Stage4(10, 0, 2): conv3×3: BN: ReLU-conv1×1: BN: ReLU-conv3×3: BN: ReLU|add.

Stage5(8, 0, 1): conv1×1: BN: ReLU-conv1×1: BN: ReLU-conv1×1; BN: ReLU|add.

Convolutional neural network ISyNet-N1-S5 (№ 803-1-10-11-13), comprising of:

Stage1(1, 0, 1): conv7×7: BN: ReLU|add.

Stage2(1, 0, 1): conv1×5_5×1: BN: ReLU-conv1×1: BN: ReLU-conv3×3: BN: ReLU-conv5×5; BN: ReLU|add.

Stage3(10, 1, 1): conv3×3: BN: ReLU-conv3×3: BN: ReLU-conv3×3: BN: ReLU|add.

Stage4(11, 0, 2): conv3×3: BN: ReLU-conv1×1: BN: ReLU-conv3×3: BN: ReLU|add.

Stage5(13, 0, 1): conv1×1: BN: ReLU-conv1×1: BN: ReLU-conv1×1: BN: ReLU|add.

Convolutional neural network ISyNet-N2 (№ 837), comprising of:

Stage1(1, 0, 1): conv3×3: BN: ReLU-conv7×7: BN: ReLU-conv7×7: BN: ReLU|add.

Stage2(3, 0, 2): conv5×5: BN: ReLU-conv3×3: BN: ReLU-conv3×3: BN: no|no.

Stage3(4, 0, 1): conv3×3: BN: ReLU-conv3×3: BN: ReLU|add.

Stage4(17, 1, 1): conv3×3: BN: ReLU-conv1×1:BN: no|add.

Stage5(2, 2, 1): conv1×1: BN: ReLU-conv1×1: BN: ReLU-conv1×1: BN: ReLU|add.

Convolutional neural network ISyNet-N3 (№ 992), comprising of:

Stage1(1, 1, 1): conv5×5: BN: ReLU-conv7×7: BN: ReLU|no.
Stage2(5, 1, 1): conv3×3; BN; ReLU-conv3×3: BN: no|add.
Stage3(3, 1, 1): conv3×3: BN: ReLU-conv1×3_3×1: BN: ReLU-conv3×3; BN: ReLU-conv3×3: BN: ReLU|add.
Stage4(13, 1, 1): conv1×3_3×1: BN: ReLU-conv1×1: BN: ReLU-conv3×3: BN; no|add.
Stage5(1, 2, 1): conv1×1: BN: ReLU-conv1×1: BN: ReLU-conv1×1: BN: ReLU|add.

Convolutional neural network ISyNet-N3-S1 (№ 992-5-6-14-2), comprising of:

Stage1(1, 1, 1): conv5×5: BN: ReLU-conv7×7: BN: ReLU|no.
Stage2(5, 1, 1): conv3×3: BN: ReLU-conv3×3: BN: no|add.
Stage3(6, 1, 1): conv3×3: BN: ReLU-conv1×3_3×1: BN: ReLU-conv3×3: BN: ReLU-conv3×3: BN: ReLU|add.
Stage4(14, 1, 1): conv1×3_3×1: BN: ReLU-conv1×1: BN: ReLU-conv3×3: BN: no|add.
Stage5(2, 2, 1): conv1×1: BN: ReLU-conv1×1: BN: ReLU-conv1×1: BN: ReLU|add.

Convolutional neural network ISyNet-N3-S2 (№ 992-6-6-16-2), comprising of:

Stage1(1, 1, 1): conv5×5: BN: ReLU-conv7×7: BN: ReLU|no.
Stage2(6, 1, 1): conv3×3: BN: ReLU-conv3×3: BN; no|add.
Stage3(6, 1, 1): conv3×3: BN: ReLU-conv1×3_3×1: BN: ReLU-conv3×3: BN: ReLU-conv3×3: BN: ReLU|add.
Stage4(16, 1, 1): conv1×3_3×1: BN: ReLU-conv1×1: BN: ReLU-conv3×3: BN: no|add.
Stage5(2, 2, 1): conv1×1: BN: ReLU-conv1×1; BN: ReLU-conv1×1: BN: ReLU|add.

It is noted that the above mentioned architectures are exemplary and particularly advantageous. These architectures are found by the above-described approach that is friendly e.g. for an AI accelerator. They are constructed automatically, so they are optimal by design. However, the present disclosure is in no way limited to these architectures. The above described approaches for searching architectures may provide further different architectures, which may be well suited for a particular hardware and/or application.

Implementations in Software and Hardware

As shown above, enable efficiently searching for NPU-friendly architectures approaches to search for neural networks architectures that have high accuracy and low latency on NPU devices have been presented above, including an advantageous measure of hardware friendless for network architectures search space—Matrix Efficiency Measure (MEM); hardware-friendly architecture search space that may reduce cost of search of architectures and allow to obtain fast and accurate NN architectures; and an efficient scaling approach to transform lightweight models to slower but more accurate, keeping optimal tradeoff between accuracy and speed.

In some aspects, apparatuses are provided for implementing the searching for one or more neural network, NN, architectures. An exemplary apparatus comprises a processing circuitry configured to determine a search space comprising a plurality of architectures including one or more blocks, wherein a block is formed by one or more NN layers and the determining is based on a measure including: (A) an amount of matrix operations, and/or (B) one of i) an amount of layer input data and/or layer output data and ii) an amount of vector operations. The processing circuitry is further configured to search for the one or more NN architectures in the determined search space. It is noted that the functions performed by the processing circuitry may correspond to functional and/or physical modules. For example, the determination of search space may be performed by a search space determination module, while the search may be performed by a search module.

In some aspects, apparatuses are provided for implementing the searching for one or more neural network, NN, architectures. An exemplary apparatus comprises processing circuitry configured to: execute the architecture A on a desired target device, to measure latencies for respective blocks of the architecture A; determine a subset of candidate scaled architectures, including the blocks of the architecture A, according to the measured latencies, wherein the subset includes those candidate scaled architectures which have latency within a predetermined range; train the candidate scaled architectures of the subset; and select among the candidate trained scaled architectures of the subset one or more best trained scaled architectures based on an inference accuracy. It is noted that the functions performed by the processing circuitry may correspond to functional and/or physical modules. For example, the execution of the architecture A on a desired target device may be controlled (instructed) by an execution control module. A candidate determination module may determine the subset of candidate scaled architectures. Training module may be responsible for training the candidate scaled architectures. A selection module may perform the selection among the candidate trained scaled architectures.

Figure 12:
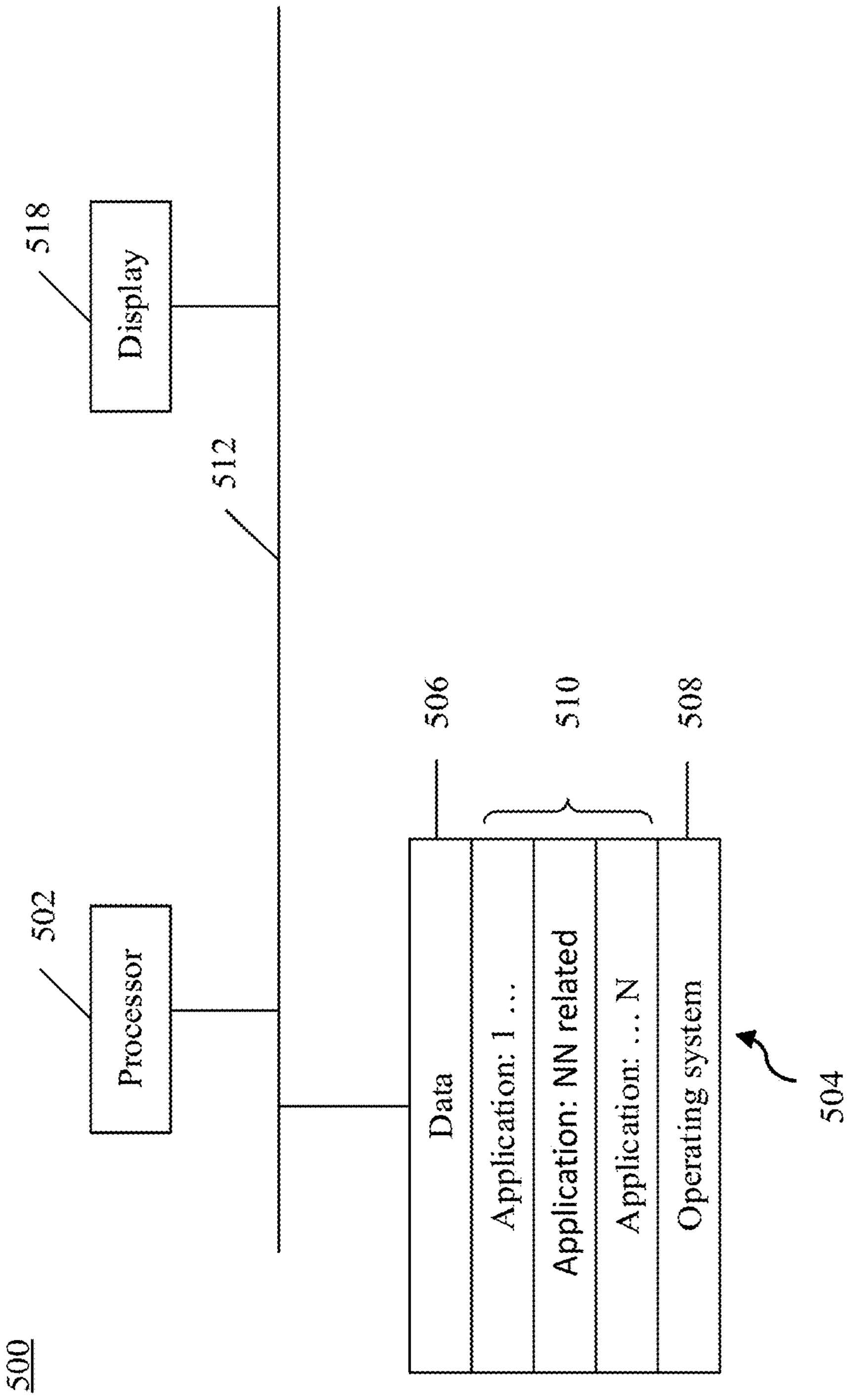
FIG. 12 is a schematic drawing is a block diagram illustrating an apparatus configured to implement some embodiments.

FIG. 12 is a simplified block diagram of an apparatus 500 that may be used as either or both of the above mentioned apparatus for searching NN architectures and apparatus for rescaling according to an exemplary embodiment.

The processor 502 in the apparatus 500 is an exemplary embodiment of the processing circuitry mentioned above and may be a central processing unit. Alternatively, the processor 502 may be any other type of device, or multiple devices, capable of manipulating or processing information now-existing or hereafter developed. Although the disclosed implementations may be practiced with a single processor as shown, for example, the processor 502, advantages in speed and efficiency can be achieved using more than one processor.

A memory 504 in the apparatus 500 may be a read-only memory (ROM) device or a random access memory (RAM) device in an implementation. Any other suitable type of storage device may be used as the memory 504. The memory 504 may include code and data 506 that is accessed by the processor 502 using a bus 512. The memory 504 may further include an operating system 508 and application programs 510, where the application programs 510 include at least one program that permits the processor 502 to perform the methods described here. For example, the application programs 510 may include applications 1 through N, which further include an application that performs the methods described here. For example, the application may execute the determination of the search space for the NN architecture as mentioned above. In addition or alternatively, the application may execute the re-scaling described above. In addition or alternatively, the application may implement the neural network obtained by the search, possibly involving the rescaling. The application may use such neural network for inference. The neural network may be employed for any desired application. For instance, image or video processing such as object recognition, object detection, image or video segmentation, image or video coding, image or video filtering or the like. The neural network may be used for classification purposes or for processing of signals other than image signal, e.g. for processing of audio signal or for processing of transmission and/or reception signals in communication technology or the like.

The apparatus 500 may also include one or more output devices, such as a display 518. The display 518 may be, in one example, a touch sensitive display that combines a display with a touch sensitive element that is operable to sense touch inputs. The display 518 may be coupled to the processor 502 via the bus 512.

Although depicted here as a single bus, the bus 512 of the apparatus 500 can be composed of multiple buses. Further, a secondary storage 514 may be directly coupled to the other components of the apparatus 500 or may be accessed via a network and may include a single integrated unit such as a memory card or multiple units such as multiple memory cards. The apparatus 500 may thus be implemented in a wide variety of configurations.

Figure 13:
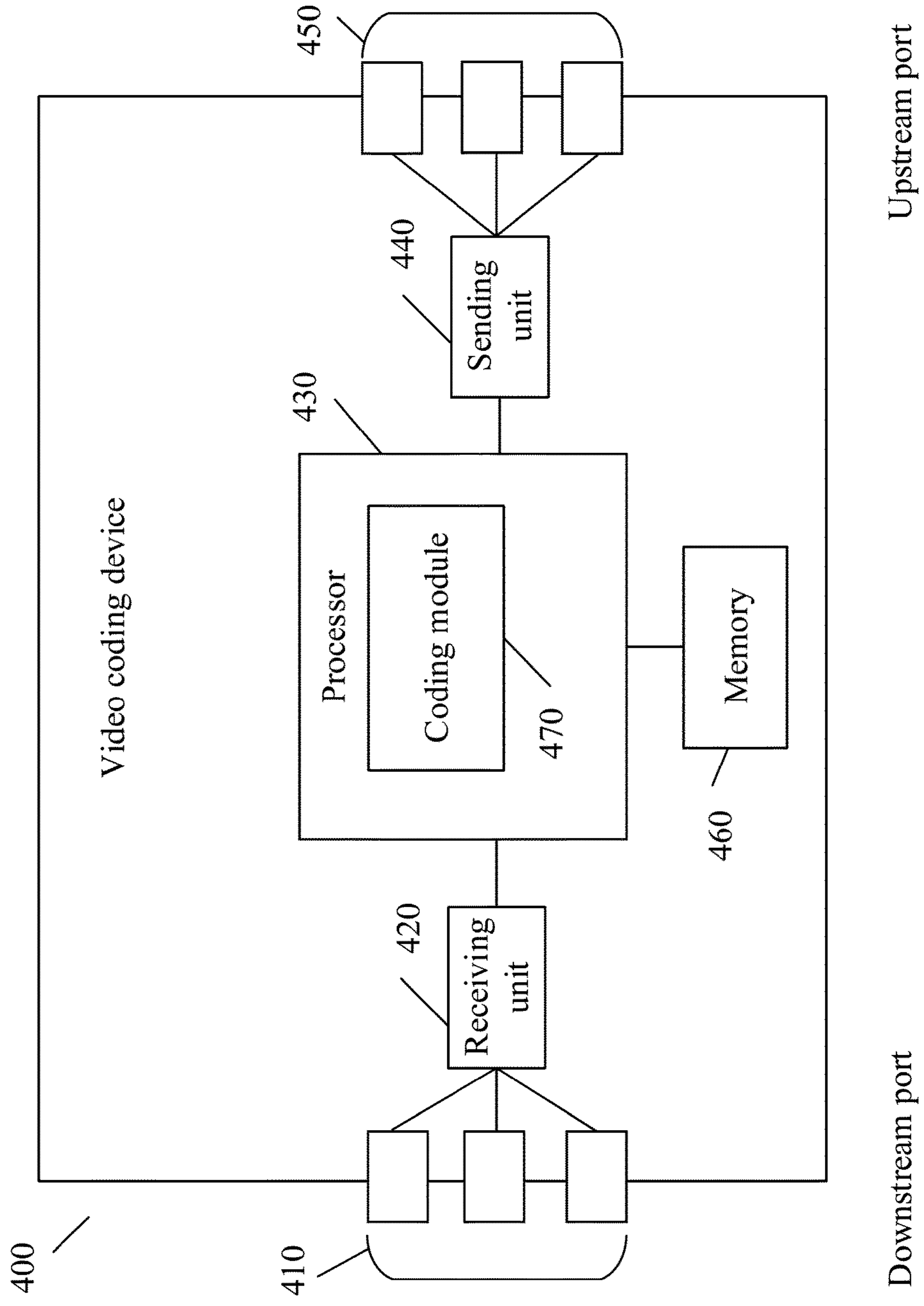
FIG. 13 is a block diagram illustrating an exemplary image or video coding apparatus configured to employ neural networks result of some embodiments for image or video coding.

FIG. 13 is a schematic diagram of a video coding device 400 according to an embodiment of the disclosure. The video coding device 400 is suitable for implementing one or more neural networks obtained by the disclosed embodiments as described herein. In an embodiment, the video coding device 400 may be a decoder or an encoder.

The video coding device 400 includes ingress ports 410 (or input ports 410) and receiver units (Rx) 420 for receiving data: a processor, logic unit, or central processing unit (CPU) 430 to process the data: transmitter units (Tx) 440 and egress ports 450) (or output ports 450) for transmitting the data; and a memory 460 for storing the data. The video coding device 400 may also include optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 (similarly as other processing circuitry described above) may be implemented as one or more CPU chips, cores (for example, a multi-core processor), FPGAs, ASICs, and DSPs or NPUs. The processor 430 is in communication with the ingress ports 410, the receiver units 420, the transmitter units 440, the egress ports 450, and the memory 460. The processor 430 includes a coding module 470) (for example, a neural network NN-based coding module 470). The coding module 470) implements the disclosed embodiments described above. For instance, the coding module 470 implements, processes, prepares, or provides the various coding operations. Therefore, inclusion of the encoding/decoding module 470) provides a substantial improvement to functions of the video coding device 400 and affects a switching of the video coding device 400 to a different state. This may be achieved by the design of the neural network considering the latency and/or hardware requirements and/or application requirements. Alternatively, the coding module 470) is implemented as instructions stored in the memory 460 and executed by the processor 430.

The memory 460 includes one or more disks, tape drives, and solid-state drives, and may be used as an overflow data storage device, to store programs when such programs are selected for execution, and to store instructions and data that are read during program execution. The memory 460 may be volatile and/or non-volatile and may be read-only memory (ROM), random access memory (RAM), ternary content-addressable memory (TCAM), and/or static random-access memory (SRAM).

A person skilled in the art can understand that, the functions described with reference to various illustrative logical blocks, modules, and algorithm steps disclosed and described in this specification can be implemented by hardware, software, firmware, or any combination thereof. If implemented by software, the functions described with reference to the illustrative logical blocks, modules, and steps may be stored in or transmitted over a computer-readable medium as one or more instructions or code and executed by a hardware-based processing unit. The computer-readable medium may include a computer-readable storage medium, which corresponds to a tangible medium such as a data storage medium, or may include any communications medium that facilitates transmission of a computer program from one place to another (for example, according to a communications protocol). In this manner, the computer-readable medium may generally correspond to: (1) a non-transitory tangible computer-readable storage medium, or (2) a communications medium such as a signal or a carrier. The data storage medium may be any usable medium that can be accessed by one or more computers or one or more processors to retrieve instructions, code, and/or data structures for implementing the technologies described in this application. A computer program product may include a computer-readable medium.

By way of example but not limitation, such computer-readable storage media may include a RAM, a ROM, an EEPROM, a CD-ROM or another compact disc storage apparatus, a magnetic disk storage apparatus or another magnetic storage apparatus, a flash memory, or any other medium that can be used to store desired program code in a form of an instruction or a data structure and that can be accessed by a computer. In addition, any connection is properly referred to as a computer-readable medium. For example, if an instruction is transmitted from a website, a server, or another remote source through a coaxial cable, an optical fiber, a twisted pair, a digital subscriber line (DSL), or a wireless technology such as infrared, radio, or microwave, the coaxial cable, the optical fiber, the twisted pair, the DSL, or the wireless technology such as infrared, radio, or microwave is included in a definition of the medium. However, it should be understood that the computer-readable storage medium and the data storage medium do not include connections, carriers, signals, or other transitory media, but actually mean non-transitory tangible storage media. Disks and discs used in this specification include a compact disc (CD), a laser disc, an optical disc, a digital versatile disc (DVD), and a Blu-ray disc. The disks usually reproduce data magnetically, whereas the discs reproduce data optically by using lasers. Combinations of the foregoing items should also be included in the scope of the computer-readable media.

An instruction may be executed by one or more processors such as one or more digital signal processors (DSP), general-purpose microprocessors, application-specific integrated circuits (ASIC), field programmable gate arrays (FPGA), or other equivalent integrated or discrete logic circuits. Therefore, the term "processor" used in this specification may be any of the foregoing structures or any other structure suitable for implementing the technologies described in this specification. In addition, in some aspects, the functions described with reference to the illustrative logical blocks, modules, and steps described in this specification may be provided within dedicated hardware and/or software modules configured for encoding and decoding, or may be incorporated into a combined codec. In addition, the technologies may be all implemented in one or more circuits or logic elements.

The technologies in this application may be implemented in various apparatuses or devices, including a wireless handset, an integrated circuit (IC), or a set of ICs (for example, a chip set). Various components, modules, or units are described in this application to emphasize functional aspects of the apparatuses configured to implement the disclosed technologies, but are not necessarily implemented by different hardware units. Actually, as described above, various units may be combined into a hardware unit in combination with appropriate software and/or firmware, or may be provided by interoperable hardware units (including one or more processors described above).

The foregoing descriptions are merely examples of specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for searching for one or more neural network (NN) architectures, the method comprising:

determining a search space comprising a plurality of architectures comprising one or more blocks, wherein a block of the one or more blocks is formed by one or more NN layers and the determining is based on a measure comprising:

an amount of matrix operations, and/or at least one of:

i) an amount of layer input data and/or layer output data, and ii) an amount of vector operations; and searching for the one or more NN architectures in the determined search space, wherein the measure comprises a ratio of the amount of matrix operations and the amount of layer input data and/or layer output data, wherein the measure for a block of the one or more blocks is or comprises the term:

$$\frac{w_m * \Sigma_{i=1}^{N} m(o_i)}{\Sigma_{i=1}^{N}(w_m * m(o_i) + w_d * d(o_i))};$$

wherein $m(o_i)$ represents an amount of matrix operations for an operation $o_i$, $d(o_i)$ represents an amount of layer input data and layer output data for the operation, $o_i$, $w_m$ and $w_d$ are predetermined weight factors, i is an integer index, and N is a number of operations in the one or more blocks.

2. The method according to claim 1, wherein the measure comprises a ratio of the amount of matrix operations and the amount of vector operations.

3. The method according to claim 1, wherein the determining of the search space further comprises applying one or more of the following constraints:

a) each architecture comprises a plurality of stages limited by a predefined maximum of stages, each stage comprises one or more of the blocks out of a limited set of blocks, the number of blocks in each stage being limited by a predefined maximum of blocks;

b) each block comprises one or more of convolution layers out of a predefined set of convolution layers with mutually different convolution kernel sizes and/or strides, each convolution layer is followed by a normalization and/or activation;

c) the activation is a rectified linear unit (ReLU) and the normalization is a batch normalization;

d) output of the block is configurable to include or not to include a skip connection;

e) one or more blocks in each stage increases the number of channels;

f) the first block in a stage has a stride of 2 or more in a first non-identity layer and no skip connection.

4. The method according to claim 1, wherein:

the determining the search space includes selecting a design of search space with one or more constraints on composition or order of blocks within an NN architecture; and the design of search space is selected out of a set of designs of search space based on a function of the measure calculated for a plurality of architectures pertaining to the design of search space.

5. The method according to claim 1, wherein the searching for the one or more NN architectures comprises performing K times, K being a positive integer, the following steps:

pseudo-randomly selecting a first set of candidate architectures from the search space;

obtaining a second set of candidate architectures by removing from the first set of candidate architectures, candidate architectures which do not satisfy a predefined condition including latency and/or accuracy; and training each candidate architecture of the second set and determining a quality and a latency of the trained candidate architecture.

6. The method according to claim 5, wherein the searching for the one or more NN architectures comprises:

selecting, from the second set, a third set of candidate architectures according to the determined quality and latency of the candidate architectures in the second set;

applying a scaling procedure to each of the candidate architectures in the third set resulting in a fourth set of scaled candidate architectures;

training each of the scaled candidate architectures of the fourth set;

evaluating quality and/or latency each of the trained scaled architectures of the fourth set; and selecting, based on the evaluation, from the trained scaled candidate architectures of the fourth set, a fifth set of architectures as a result of the searching step.

7. The method according to claim 6, wherein the scaling procedure for a candidate architecture A out of the third set comprises performing one or more times:

executing the architecture A on a desired target device, to measure latencies for respective blocks of the architecture A;

determining a subset of candidate scaled architectures, including the respective blocks of the architecture A, according to the measured latencies, wherein the subset includes candidate scaled architectures with a respective latency associated with the respective blocks of architecture A within a predetermined range;

training the candidate scaled architectures of the subset; and selecting among the candidate trained scaled architectures of the subset one or more best trained scaled architectures and include them into the fourth set based on an inference accuracy.

8. The method according to claim 7, wherein the step of the determining the subset of candidate scaled architectures comprises:

selecting, among possible scaled architectures, a plurality of scaled architectures which:

include each block of the architecture A in at least one stage; and the sum of a block latency multiplied by the number of the stages the block is in for each block is within the predetermined range.

9. The method according to claim 7, wherein the predetermined range is given by a desired target latency and a latency error margin specifying by how much a latency of a scaled architecture is allowed to deviate from the desired target latency.

10. The method according to claim 6, wherein the applying the scaling procedure is performed iteratively multiple times.

11. The method according to claim 1, further comprising:

selecting the one or more blocks depending on a desired application, and using the one or more NN architectures resulting from the search for the desired application.

12. A non-transitory computer-readable medium comprising code instructions which when executed on one or more processors, cause the one or more processors to execute the method according to claim 1.

13. An apparatus for searching for one or more neural network (NN) architectures, the apparatus comprising a processing circuitry configured to:

determine a search space comprising a plurality of architectures including one or more blocks, wherein a block of the one or more blocks is formed by one or more NN layers and the determining is based on a measure comprising:

an amount of matrix operations, and/or at least one of:

i) an amount of layer input data, and/or layer output data and ii) ii) an amount of vector operations; and search for the one or more NN architectures in the determined search space, wherein the measure comprises a ratio of the amount of matrix operations and the amount of layer input data and/or layer output data, wherein the measure for a block of the one or more blocks is or comprises the term:

$$\frac{w_m * \sum_{i=1}^{N} m(o_i)}{\sum_{i=1}^{N} (w_m * m(o_i) + w_d * d(o_i))}; \text{ and}$$

wherein $m(o_i)$ represents an amount of matrix operations for an operation $o_i$, $d(o_i)$ represents an amount of layer input data and layer output data for the operation, $o_i$, $w_m$ and $w_d$ are predetermined weight factors, i is an integer index, and N is a number of operations in the one or more blocks.

* * * * *